(12) United States Patent
Strandborg et al.

(10) Patent No.: US 12,501,021 B1
(45) Date of Patent: Dec. 16, 2025

(54) REUSING PIXEL-ACCURATE GRAPHICS RASTERIZATION IN MULTISCOPIC DISPLAYS

(71) Applicant: Distance Technologies Oy, Helsinki (FI)

(72) Inventors: Mikko Strandborg, Hangonkylä (FI); Joona Petrell, Tampere (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/307,137

(22) Filed: Aug. 22, 2025

Related U.S. Application Data

(63) Continuation-in-part of application No. 19/299,908, filed on Aug. 14, 2025.

(51) Int. Cl.
| | |
|---|---|
| *H04N 13/371* | (2018.01) |
| *H04N 13/111* | (2018.01) |
| *H04N 13/15* | (2018.01) |
| *H04N 13/189* | (2018.01) |
| *H04N 13/324* | (2018.01) |
| *H04N 13/383* | (2018.01) |

(52) U.S. Cl.
CPC ......... *H04N 13/371* (2018.05); *H04N 13/111* (2018.05); *H04N 13/15* (2018.05); *H04N 13/189* (2018.05); *H04N 13/324* (2018.05); *H04N 13/383* (2018.05)

(58) Field of Classification Search
CPC .... H04N 13/371; H04N 13/111; H04N 13/15; H04N 13/189; H04N 13/324; H04N 13/383
See application file for complete search history.

(56) References Cited

U.S. PATENT DOCUMENTS

2019/0124313 A1* 4/2019 Li .................. H04N 13/324

* cited by examiner

*Primary Examiner* — Tat C Chio
(74) *Attorney, Agent, or Firm* — Ziegler IP Law Group, LLC.

(57) ABSTRACT

A graphical element is rasterized onto a set of light-emitting elements based on perceived shapes, perceived angular sizes and relative perceived positions of the light-emitting elements from a perspective of a given eye. Colour values, computed for the light-emitting elements based on the rasterization of the graphical element, are stored along with cadence information indicating a reference cadence of a reference light-emitting element in the set with respect to a multiscopic cell. When a cadence of a corresponding light-emitting element in another set matches the reference cadence within a predefined similarity threshold, the stored colour values are reused for light-emitting elements of the another set to display the graphical element to the given eye.

20 Claims, 4 Drawing Sheets

REUSING PIXEL-ACCURATE GRAPHICS RASTERIZATION IN MULTISCOPIC DISPLAYS

CROSS-REFERENCE TO RELATED APPLICATIONS

This application is a continuation-in-part of U.S. patent application Ser. No. 19/299,908, titled "PIXEL-ACCURATE GRAPHICS RASTERIZATION FOR MULTISCOPIC DISPLAYS" filed on Aug. 14, 2025, which is incorporated herein by reference.

TECHNICAL FIELD

The present disclosure relates to systems for performing rasterizations and reusing rasterization results in multiscopic displays. The present disclosure also relates to methods for performing rasterizations and reusing rasterization results in multiscopic displays.

BACKGROUND

Augmented-reality (AR) heads-up displays (HUDs) and other light field display systems typically render graphical elements by identifying, for each light-emitting element, a direction within a user's field of view along which emitted light will reach a given eye of the user. A corresponding colour value is then sampled at a location that matches the identified direction. This approach is well suited to rendering three-dimensional (3D) environments and virtual objects, where the output depends on spatial depth and surface shading.

However, in certain use cases, such as the rendering of text, user interface (UI) elements, or other forms of vector graphics, it is desirable to rasterize a graphical element directly and with high accuracy, without relying on intermediate resampling stages. Accurate rasterization in these cases is complicated by the optical configuration of multiscopic displays.

To produce multiscopic effects, a multiscopic display incorporates a multiscopic optical element that redirects light from different sets of light-emitting elements toward different viewing directions. When implemented using a lenticular array, a perceived layout of light-emitting elements may appear distorted, shifted, or even mirrored, depending on a viewing direction and a geometry of the lenticular array. A similar effect occurs with parallax barriers, where opaque portions introduce discontinuous visibility gaps between light-emitting elements. These effects make it difficult to align high-precision graphical content with the perceived layout of light-emitting elements, especially when rasterizing in a user-dependent and view-accurate manner.

U.S. patent application Ser. No. 19/299,908 discloses techniques for addressing these challenges by enabling rasterization of graphical elements based on the perceived geometry of light-emitting elements for a given eye position. These techniques allow for direct generation of colour values without reliance on intermediate projection or resampling. However, such techniques still require the graphical element to be re-rasterized whenever the user's eye position changes, as each new eye position corresponds to a different light path geometry through the multiscopic optical element.

In typical multiscopic displays, parallax and depth cues are achieved by continuously tracking the positions of the user's eyes and updating the displayed images accordingly. A graphical element that is not positioned at a native optical distance of a multiscopic display appears to shift as the user's viewpoint moves. In order to preserve rasterization accuracy under such motion, the graphical element must be re-rendered at a new location on the multiscopic display. However, the new location may no longer align with the same arrangement or phase of the light-emitting elements used for the rasterization. As a result, direct reuse of the previously-rasterized graphical content is often infeasible.

This leads to two major challenges. First, re-rasterizing high-quality vector graphics (such as text glyphs) for every eye position is computationally expensive and introduces latency. Second, simply storing the rasterized output as an image and repositioning it across the multiscopic display leads to degraded visual quality. This is due to a mismatch between a previous set of light-emitting elements and a new set of light-emitting elements, resulting in visual artifacts and blurring from unintended resampling.

This problem arises because adjacent multiscopic cells (such as lenticular lenses) introduce sharp transitions in which sets of light-emitting elements are visible to different viewing directions. These multiscopic transitions often involve visibility gaps or cadence discontinuities between sets of light-emitting elements. Even a small spatial shift in the position of a graphical element may lead to a completely different set of visible light-emitting elements. As a result, the previously-computed rasterization no longer matches the local cadence of the new location on the multiscopic display.

Accordingly, there exists a need for systems and methods that support reusing rasterization results under eye and head movement, without requiring re-rasterization at each frame, while still preserving spatial fidelity and appearance in multiscopic displays.

SUMMARY

The present disclosure seeks to provide a system and method for performing rasterizations and reusing rasterization results in multiscopic displays during eye and head movement, without requiring re-rasterization at each frame. The aim of the present disclosure is achieved by a system and a method in which graphical elements are rasterized directly onto a set of light-emitting elements that emit light toward a given eye of a user, and resulting colour values are reused at other locations on the multiscopic display when reuse criteria are satisfied based on cadence similarity, thereby enabling high-fidelity rendering of vector graphics with reduced computational overhead, while preserving spatial and angular accuracy under dynamic user movement, as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1C is a schematic illustration of a portion of an array of light-emitting elements of the multiscopic display as viewed by a given eye through a multiscopic optical element, while

DETAILED DESCRIPTION OF EMBODIMENTS

Figure 1A:
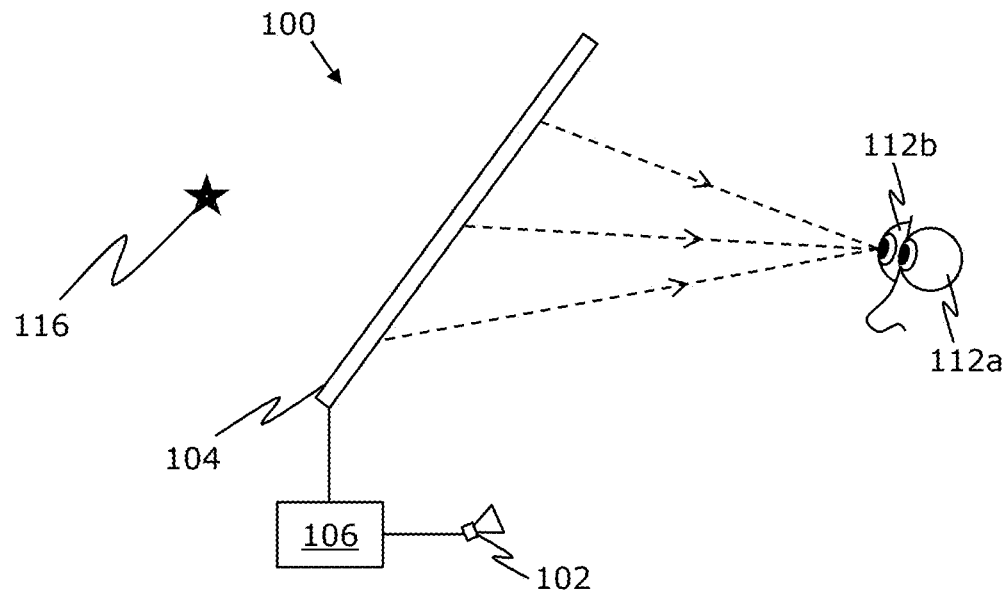
FIGS. 1A and 1B are schematic illustrations of a system for performing rasterization and reusing rasterization results in a multiscopic display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  a tracker;
  a multiscopic display comprising:
    an array of light-emitting elements; and
    a multiscopic optical element arranged on an optical path of the array of light-emitting elements, the multiscopic optical element comprising a plurality of multiscopic cells; and
  at least one processor configured to:
    determine a relative location of each eye of at least one user with respect to an image plane of the multiscopic display, using the tracker;
    determine a three-dimensional (3D) view frustum corresponding to a given eye of the at least one user, based on a relative location of the given eye with respect to the image plane;
    identify a set of light-emitting elements in the array to be employed to display a graphical element to the given eye, based on a position of the graphical element in the 3D view frustum;
    determine, for each light-emitting element in the set, a perceived shape and a perceived angular size of said light-emitting element from a perspective of the given eye, based on the relative location of the given eye with respect to the image plane, and on optical distortion parameters of the multiscopic optical element;
    rasterize the graphical element onto the set of light-emitting elements based at least on relative perceived positions of the light-emitting elements in the set from the perspective of the given eye, and the perceived shape and the perceived angular size of each light-emitting element in the set;
    compute a colour value for each light-emitting element in the set based on the rasterization of the graphical element;
    store, for the graphical element, computed colour values for the light-emitting elements in the set, along with cadence information indicating a reference cadence of a reference light-emitting element in the set with respect to a multiscopic cell;
    update the 3D view frustum corresponding to the given eye, based on a current or predicted relative location of the given eye with respect to the image plane;
    identify another set of light-emitting elements in the array to be employed to display the graphical element to the given eye, based on the position of the graphical element in the updated 3D view frustum;
    determine whether a cadence of a corresponding light-emitting element in the another set with respect to another multiscopic cell matches the reference cadence of the reference light-emitting element in the set within a predefined similarity threshold; and
    when it is determined that the cadence of the corresponding light-emitting element in the another set matches the reference cadence within the predefined similarity threshold, reuse the stored colour values for the light-emitting elements of the another set to display the graphical element to the given eye.

In a second aspect, an embodiment of the present disclosure provides a method comprising:
  determining a relative location of each eye of at least one user with respect to an image plane of a multiscopic display, using a tracker, wherein the multiscopic display comprises an array of light-emitting elements and a multiscopic optical element arranged on an optical path of the array of light-emitting elements, the multiscopic optical element comprising a plurality of multiscopic cells;
  determining a three-dimensional (3D) view frustum corresponding to a given eye of the at least one user, based on a relative location of the given eye with respect to the image plane;
  identifying a set of light-emitting elements in the array to be employed to display a graphical element to the given eye, based on a position of the graphical element in the 3D view frustum;
  determining, for each light-emitting element in the set, a perceived shape and a perceived angular size of said light-emitting element from a perspective of the given eye, based on the relative location of the given eye with respect to the image plane, and on optical distortion parameters of the multiscopic optical element;
  rasterizing the graphical element onto the set of light-emitting elements based at least on relative perceived positions of the light-emitting elements in the set from the perspective of the given eye, and the perceived shape and the perceived angular size of each light-emitting element in the set;
  computing a colour value for each light-emitting element in the set based on the rasterization of the graphical element;
  storing, for the graphical element, computed colour values for the light-emitting elements in the set, along with cadence information indicating a reference cadence of a reference light-emitting element in the set with respect to a multiscopic cell;
  updating the 3D view frustum corresponding to the given eye, based on a current or predicted relative location of the given eye with respect to the image plane;
  identifying another set of light-emitting elements in the array to be employed to display the graphical element to the given eye, based on the position of the graphical element in the updated 3D view frustum;
  determining whether a cadence of a corresponding light-emitting element in the another set with respect to another multiscopic cell matches the reference cadence of the reference light-emitting element in the set within a predefined similarity threshold; and
  when it is determined that the cadence of the corresponding light-emitting element in the another set matches the reference cadence within the predefined similarity threshold, reusing the stored colour values for the light-emitting elements of the another set to display the graphical element to the given eye.

The present disclosure provides the aforementioned system and the aforementioned method for rasterizing a graphical element directly onto a set of light-emitting elements of a multiscopic display without a need for an intermediate resampling step, and reusing previously-computed colour values when reuse criteria are satisfied. By determining, for the graphical element, a reference cadence of a reference light-emitting element in the set and comparing it with a cadence of a corresponding light-emitting element in another set at a new location, the system and method enable direct reuse of the rasterization results (namely, the stored colour values) without the need to re-rasterize the graphical element at each frame. When the cadence match is determined to fall within the predefined similarity threshold, the stored colour values are reused at the new location, preserving the appearance of the graphical element during eye and head movement.

By storing cadence-aligned rasterization results and enabling their reuse when cadence similarity criteria are satisfied, the system and method reduce redundant computation during eye or head movement. This avoids unnecessary re-rasterization of vector graphics (such as font glyphs) and supports efficient rendering of graphical elements while preserving their appearance. The reuse operation is performed only when the another set of light-emitting elements satisfies a cadence match with the reference light-emitting element used in the rasterization. This enables reuse of previously-computed colour values without requiring resampling, interpolation, or image realignment, thereby avoiding visual degradation and preserving output fidelity.

The system and method support pixel-accurate (and sub-pixel-accurate) rendering while minimizing computational overhead in scenarios involving user movement. Because rasterization reuse is explicitly gated by cadence similarity, as determined with respect to the multiscopic optical element, the output remains visually stable and consistent across small positional shifts. As a result, the system and method are suitable for latency-sensitive applications in which the user's viewpoint changes continuously, and graphical elements must maintain spatial sharpness without incurring full re-rasterization. The reuse mechanism achieves rendering efficiency without compromising display accuracy, and is compatible with a wide range of multiscopic optical architectures, including lenticular arrays and parallax barriers.

It will be appreciated that the system can be implemented as a heads-up display (HUD) in a vehicle. In some implementations, the multiscopic display may be implemented as a transparent display integrated into a windshield of the vehicle. One example of such a transparent display is described in U.S. patent application Ser. No. 18/818,717, titled "Augmenting Reality with Multiscopic See-through Display", which is incorporated herein by reference. In other implementations, the multiscopic display may be implemented as a non-transparent display used in conjunction with an optical combiner integrated into the windshield. In such implementations, the optical combiner is arranged on an optical path of the non-transparent display and an optical path of a real-world light field of a real-world environment.

It will also be appreciated that the system and the method are not restricted to implementation in an HUD alone. Rather, they may be employed to enable reuse of rasterization results in a variety of other applications, such as digital signage, 3D product demonstrations, or immersive educational and training visualizations, among others.

For illustration purposes only, there will now be described how the aforementioned steps can be performed. It will be appreciated that the steps have been described with respect to the given eye of the individual one of the at least one user. These steps may be performed similarly for each eye of each individual one of the at least one user.

Determining 3D View Frustum:

The 3D view frustum corresponding to the given eye is determined based on the relative location of the given eye with respect to the image plane. The 3D view frustum corresponds to a perspective projection having its origin at the location of the given eye. The position of the graphical element is evaluated with respect to the 3D view frustum. The position of the graphical element in the 3D view frustum provides a representation of a region of an eye-relative spatial field for which rasterization or reuse decisions are to be made.

In some implementations, the position of the graphical element in the 3D view frustum may be approximated by a 3D bounding volume within which the graphical element is to be rasterized for the given eye. The 3D bounding volume can be determined as a spatial region in a coordinate space defined with respect to the multiscopic display or with respect to at least one real-world reference object present in the real-world environment. For example, when the system is implemented as an HUD in a vehicle, the at least one real-world reference object may include a corner of a windshield of the vehicle, a portion of a bonnet of the vehicle, and/or a real-world object identified in a real-world image captured using at least one real-world-facing camera. The 3D bounding volume may be pre-determined by a software application or a rendering pipeline as a geometric construct (for example, a box, a sphere, a convex hull, or similar) that encompasses an intended spatial extent of the graphical element in a field of view of the given eye.

Optionally, a position and an orientation of the 3D bounding volume are anchored to the graphical element. For example, a graphical element aligned with a flat surface intended to appear at a particular optical depth may have a corresponding 3D bounding volume that is determined based on that particular optical depth, and a position and dimensions of the graphical element. Moreover, optionally, the position and the orientation of the 3D bounding volume are updated based on a change in the relative location of the given eye (for example, due to user motion). Such a dynamic adjustment allows for efficient identification of the set of light-emitting elements that are relevant for generating a view-dependent synthetic light field corresponding to the graphical element as perceived by the given eye.

Identifying Set of Light-Emitting Elements:

The set of light-emitting elements in the array to be employed to display the graphical element is identified based on the position of the graphical element in the 3D view frustum. This set includes those light-emitting elements from which light, after passing through the multiscopic optical element, is directed toward the given eye along directions that intersect the position of the graphical element in the 3D view frustum. In some implementations, such intersections can be determined with respect to the 3D bounding volume described above.

Optionally, identifying the set of light-emitting elements comprises modelling directional light paths of individual light-emitting elements based on the optical distortion parameters of the multiscopic optical element. Each light-emitting element has a corresponding emission direction or angular range of emission directions, which is determined based on the optical distortion parameters of the multiscopic optical element. The optical distortion parameters could include at least one of: a refractive index of a material of the multiscopic optical element, a focal length of a single multiscopic cell (such as a lenticular lens) of the multiscopic optical element, a thickness of the multiscopic optical element, a pitch of the multiscopic optical element, a phase of the multiscopic optical element relative to the array of light-emitting elements.

For each light-emitting element, a forward projection may be performed to determine the direction in which light emitted by said light-emitting element is redirected by the multiscopic optical element. This forward projection is computed based on a spatial position of the light-emitting element within the array, the optical distortion parameters of the multiscopic optical element, and the relative location of the given eye with respect to the image plane of the multiscopic display. A direction vector resulting from this forward projection defines a ray in 3D space representing the direction in which the light from said light-emitting element travels toward the eye. If the direction of this ray intersects the position of the graphical element in the 3D view frustum (or the 3D bounding volume), either along the forward projection or when extended (that is, back-projected) in an opposite direction, the light-emitting element is included in the identified set for the given eye.

Notably, back-projection may be used to determine such intersection where the graphical element lies at an optical depth that is greater than a native optical distance between the multiscopic display and the given eye. The term "native optical distance" refers to an optical distance between the multiscopic display and the given eye along an optical path of the synthetic light field.

This identification process ensures that only those light-emitting elements that contribute light along a direction intersecting the position of the graphical element (or the 3D bounding volume), as perceived by the given eye, are included in the rasterization process. As a result, the system and method support accurate, view-dependent rendering consistent with multiscopic optics and the user's dynamically changing viewpoint.

Determining Perceived Shape and Perceived Angular Size:

In some implementations, determining the perceived shape and the perceived angular size of each light-emitting element in the set comprises computing a projection of a shape of a physical aperture of the light-emitting element onto a sphere centred at a location of the given eye. This projection may be modelled based on the optical distortion parameters of the multiscopic optical element and the spatial position of the light-emitting element within the array.

Additionally or alternatively, optical ray tracing or geometric approximation techniques may be used to determine an apparent distortion of the shape of the physical aperture of the light-emitting element shape by the multiscopic optical element. Such apparent distortion may, for example, include stretching or shearing. The perceived shape and the perceived angular size may be determined using calibration data or analytical formulations that account for lens-induced magnification, parallax displacement, and/or aberration correction, depending on a type of the multiscopic optical element.

The perceived angular size may be defined in terms of a solid angle (e.g., steradians) subtended by the projected shape, or as a cone angle measured along principal axes. The perceived shape may be approximated as a polygonal region whose angular extents define a bounded region within the field of view of the given eye.

Determining Relative Perceived Positions:

In some implementations, the relative perceived positions of the light-emitting elements in the set are determined by calculating direction vectors from the given eye toward centre points of the light-emitting elements in the set, as redirected through the multiscopic optical element. These direction vectors are calculated based on the optical distortion parameters of the multiscopic optical element. As an example, in a case where the multiscopic optical element is a lenticular array, the relative perceived positions of the light-emitting elements can be determined based on whether a focal length of a lenticular lens in the lenticular array is greater than or smaller than an effective thickness of the lenticular lens along the viewing direction of the given eye.

Each direction vector defines an angular origin point in the field of view of the given eye. An angular separation between angular origin points corresponding to different direction vectors of the light-emitting elements is used to determine the relative perceived positions of the light-emitting elements. The angular origin points may be defined on an imaginary surface corresponding to an outermost surface of the multiscopic optical element from which the redirected light exits.

Rasterizing Graphical Element onto Set of Light-Emitting Elements:

Rasterizing the graphical element onto the set of light-emitting elements, based on the relative perceived positions, the perceived shapes, and the perceived angular sizes, may include determining, for each light-emitting element in the set, whether and how an angular projection of the graphical element overlaps with an angular region subtended by the light-emitting element, as perceived from the given eye. This angular region is defined by the perceived shape and the perceived size of the light-emitting element. In some implementations, the graphical element is rasterized by mapping it from an angular rendering space onto a non-uniform layout formed by the relative perceived positions, the perceived shapes and the perceived sizes of the light-emitting elements.

The rasterization may be image-based, such as when performed based on an image of the graphical element (e.g., bitmap font or texture lookup). Alternatively, the rasterization may be vector-based, such as when performed based on a vector representation of the graphical element (e.g., using Bézier curves or other vector primitives). The system may support either or both types of rasterization depending on the application context.

The rasterization may include anti-aliasing, by weighting colour contributions based on a degree of an overlap between the graphical element and the angular region of each light-emitting element. This mapping may be implemented in a shader program executing on a graphics processing unit (GPU), where each light-emitting element is treated as an individually addressed output sample with a unique shape and position.

In some implementations, the rasterization can be performed on the GPU. In other implementations, the rasterization can be performed on a central processing unit (CPU), a custom application-specific integrated circuit (ASIC), or any other kind of processor.

Various techniques for GPU-driven text rendering are well-known in the art and may be leveraged in these implementations. These techniques may be adapted for use in the system and the method described herein by performing font rasterization directly within a pixel shader program.

As an example, the rasterization of a text glyph may involve evaluating Bézier curve primitives for each light-emitting element in the set. This evaluation is performed based on the perceived angular size and the perceived shape of each light-emitting element, instead of a native pixel location and a pixel size. In this regard, the size of the light-emitting element may be determined using built-in shader functions, such as fwidth( ) modified to account for the view-dependent geometry and the optical distortion parameters. A runtime framework may provide the pixel shader program with data enabling this view-dependent rasterization, ensuring that text glyphs and other vector-based graphical elements are positioned and scaled accurately on the array of light-emitting elements. This enables accurate production of the synthetic light field in accordance with the intended spatial appearance of the graphical element for the given eye. Throughout the present disclosure, the terms "glyph" and "Bézier curve" are understood in accordance with their ordinary meaning in the field of computer graphics and rendering.

Computing Colour Values:

Computing a colour value for each light-emitting element in the set based on the rasterization may comprise sampling the graphical element at a location corresponding to the perceived angular position of the light-emitting element. Throughout the present disclosure, the term "colour value" encompasses both colour and intensity of a given light-emitting element. If the graphical element is represented as a vector graphic, this may include evaluating a curve or glyph primitive at an angular position corresponding to the light-emitting element, based on its perceived angular size and shape.

Once colour values have been computed for all light-emitting elements in the set, a synthetic light field can be produced by driving each light-emitting element to emit light with an intensity corresponding to its respective computed colour value. After being directionally filtered by the multiscopic optical element, the synthetic light field presents the graphical element at its intended position and size within the field of view of the given eye. In this way, respective colour values for the light-emitting elements that emit light toward eyes of the at least one user are computed based on respective relative locations of the eyes of the at least one user, whilst taking into account the optical distortion parameters of the multiscopic optical element. By computing colour values for the light-emitting elements in the set, based on such rasterization, the system and method provide direct control over the synthetic light field produced by the multiscopic display in accordance with an intended spatial appearance of the graphical element for the given eye, without reliance on intermediate resampling or reprojection stages.

Storing Colour Values:

After computing the colour values for the light-emitting elements in the identified set based on the rasterization of the graphical element, the computed colour values are at least temporarily stored for the graphical element, for reuse in subsequent frames when reuse criteria are satisfied. The stored colour values may be organized as a mapping between unique identifiers of the light-emitting elements and their respective colour values. This mapping may be stored in memory accessible to the rendering pipeline, a rasterization subsystem, or a graphical cache. The mapping may be updated or invalidated depending on application-specific parameters, which may include at least one of: a version of the rasterization of the graphical element, a time stamp of the rasterization, a change in occlusion of the graphical element, movement of the graphical element outside a predefined reuse region.

Since the set of light-emitting elements is identified based on visibility from the given eye, the computed colour values inherently correspond only to the light-emitting elements that contribute to the graphical element's appearance for the given eye. Accordingly, the colour values may be stored in a packed format, omitting light-emitting elements that fall outside the visible projection region of the graphical element. This compact representation improves memory efficiency and lookup performance during reuse evaluation.

Alternatively, the computed colour values may be stored for the entire image region corresponding to the graphical element, including all light-emitting elements within a predefined bounding area, regardless of whether each light-emitting element contributes to the visible output for the given eye. While this approach may consume more memory compared to the packed format, it simplifies the reuse process by enabling a direct copy (such as bit block transfer) of the stored colour values to the corresponding light-emitting elements, without requiring runtime unpacking or mapping logic. This simplification is especially advantageous in GPU-based implementations, where uniform memory layouts and predictable access patterns facilitate more efficient rendering pipelines and lower per-frame processing overhead.

The colour values are stored along with the cadence information that characterizes the rasterization alignment of the graphical element with respect to the multiscopic optical element. Specifically, the cadence information comprises the reference cadence of the reference light-emitting element in the set, defined with respect to the multiscopic cell through which its light is redirected. The reference cadence corresponds to a positional or phase relationship between the reference light-emitting element and the multiscopic cell, indicating the alignment of the reference light-emitting element relative to the multiscopic cell.

The cadence may be expressed in various ways, depending on the implementation. In some implementations, the cadence is represented as an index or offset of a given light-emitting element relative to a local origin defined by the multiscopic cell (e.g., a modulo count of horizontal light-emitting element positions within a lenticular period). In other implementations, the cadence is represented as a phase shift, fractional displacement, or relative alignment with respect to a geometric centre of the multiscopic cell. For more precise characterizations, the cadence can be defined as a signed distance between a position where the reference light-emitting element is visible on a surface of the multiscopic cell and an optical centreline of the multiscopic element (such as a ridge of a lenticular lens, or a centre of a transparent portion in a parallax barrier). This centreline-referenced metric enables high-fidelity spatial matching, capturing subtle misalignments that may not be reflected by grid-based indices alone. Such precision is particularly beneficial in non-uniform or optically complex multiscopic displays. The cadence can also be associated with an identifier for the multiscopic cell, to resolve ambiguity in non-uniform arrangements. Irrespective of the implementation, the cadence is determined at a pixel level and not at a subpixel level.

In some implementations, the cadence information may be stored as metadata alongside a unique identifier of the graphical element in a lookup structure (e.g., a reuse table, glyph cache, or display-space tile buffer). This lookup structure may also include additional descriptors including at least one of: a timestamp identifier, a version identifier.

Cadence Matching Criteria and Reusing Colour Values:

From time to time, such as in each rendering frame or when motion thresholds are exceeded, the 3D view frustum corresponding to the given eye is updated based on the current or predicted relative location of the given eye with respect to the image plane. The current relative location is determined using the tracker. The predicted relative location can be determined using predictive filtering or smoothing to compensate for latency in head motion or sensor jitter.

Based on this updated 3D view frustum, the position of the graphical element is re-evaluated to identify the another set of light-emitting elements in the array to be employed to display the graphical element to the given eye. This identification is performed in a manner analogous to the initial identification of the set, such that the another set includes those light-emitting elements whose redirected light (after passing through the multiscopic optical element) intersects the updated position of the graphical element from the perspective of the given eye.

Once the another set of light-emitting elements has been identified, a cadence comparison is performed to determine whether stored rasterization results can be reused. For the corresponding light-emitting element in the another set (namely, the light-emitting element corresponding in spatial layout to the reference light-emitting element in the set), its cadence is evaluated with respect to the another multiscopic cell through which its light is redirected. This cadence is compared to the reference cadence that was stored previously for the graphical element. It is determined whether the cadence matches the reference cadence within the predefined similarity threshold. The predefined similarity threshold may be defined spatially (e.g., as a tolerance on pixel index or offset), angularly (e.g., as a tolerance on projected light direction), or using a distance metric in cadence space (e.g., modulo difference within a cell-aligned coordinate system).

When it is determined that the cadence of the corresponding light-emitting element in the another set matches the reference cadence within the predefined similarity threshold, the stored colour values are reused for the graphical element at the new location. This reuse avoids re-rasterization and enables computational savings while maintaining visual fidelity. In some implementations, the reuse may involve directly copying or referencing the stored colour values and applying them to the another set of light-emitting elements. In other implementations, a minor transformation may be applied to account for small angular or positional shifts that fall within the predefined similarity threshold.

Because the reuse decision is gated by the cadence similarity criteria that reflects the optical structure of the multiscopic display, reuse is permitted only when it preserves the alignment, sampling phase, and perceived fidelity of the rasterization. This ensures that the visual appearance of the graphical element remains stable even as the user's viewpoint shifts slightly due to eye or head movement. In this way, the system and method achieve efficient reuse of rasterization results across regions of the multiscopic display where optical alignment permits, without requiring intermediate image resampling or approximation.

Furthermore, in some implementations, when it is determined that the cadence of the corresponding light-emitting element in the another set does not match the reference cadence within the predefined similarity threshold, the graphical element is re-rasterized, namely rasterized onto the another set of light-emitting elements. To perform this re-rasterization, perceived shapes, perceived angular sizes and relative perceived positions of the light-emitting elements in the another set are determined from the perspective of the given eye, based on the current or predicted relative location of the given eye with respect to the image plane and on the optical distortion parameters of the multiscopic optical element, as described earlier.

In other implementations, the at least one processor is configured to:

when it is determined that the cadence of the corresponding light-emitting element in the another set does not match the reference cadence within the predefined similarity threshold,
  search for a further set of light-emitting elements in the array to be employed to display the graphical element to the given eye, in place of the another set of light-emitting elements, wherein:
    (i) a cadence of a corresponding light-emitting element in the further set with respect to a corresponding multiscopic cell matches the reference cadence within the predefined similarity threshold, and
    (ii) the further set of light-emitting elements lies within a predefined spatial distance threshold from the another set of light-emitting elements; and
  reuse the stored colour values for the light-emitting elements of the further set to display the graphical element to the given eye.

The further set is identified as a substitute for the another set for the purpose of displaying the graphical element to the given eye, with the objective of enabling reuse of the stored colour values while avoiding a full re-rasterization. Because a width of the multiscopic cell is typically on the order of 0.5 mm, minor positional adjustments or snapping to the further set will be nearly unnoticeable to the at least one user, while still yield a more optimal rasterization fit.

The predefined spatial distance threshold may be defined in various ways. As an example, it may be defined as a Euclidean distance between respective centres of mass of two sets in the coordinate space of the array. As another example, it may be defined as a maximum displacement, in terms of the number of light-emitting elements, along one or more axes in the array's coordinate space. As yet another example, it may be defined as an angular spatial distance between respective optical paths of the two sets towards the given eye.

The search may be performed by iterating over candidate sets within a bounding region defined by the predefined spatial distance threshold, and filtering for cadence compatibility. In some implementations, spatial indexing structures (e.g., quadtrees or tiling caches) may be used to optimize this search.

Once such a further set is found that satisfies both the cadence similarity and the spatial proximity constraint, the stored colour values from the previous rasterization are reused to drive the light-emitting elements of the further set. This reuse allows the graphical element to remain visible and visually stable from the perspective of the given eye, even if the previously-identified another set was disqualified for reuse due to cadence mismatch. If no such further set is found within the spatial proximity constraint, the graphical element may be re-rasterized onto the another set of light-emitting elements.

By searching for cadence-compatible sets within the spatial proximity constraint, the system avoids unnecessary re-rasterization in many cases where small eye movements produce only minor positional displacements that fall outside strict cadence alignment. This enhances robustness under user motion, particularly in latency-sensitive applications such as HUDs, where minor motion-induced shifts might otherwise trigger costly re-rasterization operations.

Because reuse is permitted only when the cadence similarity constraint and the spatial proximity constraint are jointly satisfied, the visual fidelity of the graphical element is preserved. In other words, reused colour values are applied only where the optical structure of the multiscopic display allows consistent light field reproduction.

Furthermore, this mechanism enables selective reuse in complex viewing conditions, such as minor eye jitter during gaze tracking, low-amplitude head tremor, or smooth pursuit motion during user interaction. By enabling rasterization reuse across small shifts in user viewpoint, while still enforcing cadence compatibility, the system achieves greater computational efficiency, reduced latency, and improved perceptual stability, without resorting to interpolation or approximation techniques that might degrade sharpness or geometry of the graphical element. Thus, the reuse fallback mechanism described above supports adaptive performance scaling in dynamic environments, making the system more suitable for real-time augmented reality applications and HUD systems with constrained rendering budgets and strict visual quality requirements.

Moreover, optionally, the at least one processor is configured to:
- determine a viewing direction from the given eye toward the set of light-emitting elements, based on the relative location of the given eye with respect to the image plane and a position of the set of light-emitting elements in the array;
- store, for the graphical element, the viewing direction in addition to the computed colour values for the light-emitting elements in the set and the cadence information;
- determine a current or predicted viewing direction from the given eye toward the another set of light-emitting elements, based on the current or predicted relative location of the given eye with respect to the image plane and a position of the another set of light-emitting elements in the array;
- determine whether an angular deviation between the current or predicted viewing direction and the stored viewing direction exceeds a predefined angular threshold; and
- when it is determined that the angular deviation exceeds the predefined angular threshold,
  - re-rasterize the graphical element onto the another set of light-emitting elements based at least on relative perceived positions of the light-emitting elements in the another set from the perspective of the given eye, and a perceived shape and a perceived angular size of each light-emitting element in the another set; and
  - compute a colour value for each light-emitting element in the another set based on the re-rasterization of the graphical element.

This viewing-direction-based reuse gating mechanism supplements the cadence-based reuse gating mechanism and provides an additional angular constraint to determine whether previously-computed colour values remain perceptually accurate under dynamic viewing conditions.

The viewing direction from the given eye toward the set of light-emitting elements represents an average or representative direction from the given eye to the spatial region of the array occupied by the set. In some implementations, this viewing direction may correspond to a direction vector from the given eye toward a geometric centre (for example, a centroid or a barycentre) of the set in the array's coordinate space, optionally accounting for optical redirection through the multiscopic optical element. This direction vector may be expressed in a local coordinate system (e.g., relative to the image plane of the multiscopic display).

The viewing direction is stored alongside the computed colour values and the cadence information for the graphical element. The viewing direction may be stored along with the cadence information as metadata in the lookup structure, indexed by the unique identifier of the graphical element.

Subsequently, when reuse is considered for the another set of light-emitting elements identified based on the updated 3D view frustum, the current or predicted viewing direction from the given eye toward this another set is determined, analogously to the initial determination. An angular deviation is calculated between this current or predicted viewing direction and the previously-stored viewing direction. In some implementations, the angular deviation is computed as an angle between two direction vectors, using vector dot product or arc-cosine functions. This angular deviation quantifies the change in perceptual alignment of the user's eye toward the graphical element.

If the angular deviation does not exceed the predefined angular threshold, the stored colour values may still be reused, provided other criteria (like cadence similarity) are satisfied. The predefined angular threshold may, for example, lie in a range of 5 to 10 degrees. In some implementations, the predefined angular threshold may be higher along a vertical direction (that is, along a longitudinal axis of a multiscopic cell) than along a horizontal direction, reflecting greater perceptual tolerance to vertical angular deviations.

However, if the angular deviation exceeds the predefined angular threshold, this indicates a significant change in the viewpoint of the user. In such cases, reuse is disallowed, and the graphical element is re-rasterized onto the another set of light-emitting elements based on the updated viewpoint. Accordingly, the graphical element is rasterized anew, as previously described, and new colour values are computed for the another set of light-emitting elements based on the re-rasterization. A synthetic light field produced using the new colour values thus reflects the corrected appearance of the graphical element for the updated viewing direction.

The view-direction-based reuse gating mechanism provides several technical advantages. First, by preventing reuse when the user's eye has shifted significantly, the system ensures that rasterized graphical elements remain visually consistent with the updated angular geometry of the multiscopic display. This avoids artifacts such as angular aliasing, geometric distortion, or incorrect parallax effects. Second, even when cadence similarity is satisfied, changes in eye alignment can lead to visually inconsistent results. The additional constraint of angular deviation filtering ensures that reuse occurs only when the user's view remains angularly close to the previous rasterization, enhancing perceptual coherence. Third, this approach accounts for rapid changes in eye or head pose, including small saccades, micro-saccades, or jitter, and ensures that reuse does not degrade spatial precision. This supports clearer rendering of sharp features such as text glyphs and fine vector shapes under motion. Fourth, the angular deviation in viewing directions operates as a complementary filter to cadence matching, catching additional edge cases where geometric layout and optical alignment may be cadence-consistent but perceptually inappropriate for reuse. Fifth, this approach aligns well with gaze-contingent systems (e.g., foveated rendering), where frequent eye movements may otherwise invalidate rasterization results. By selectively gating reuse in this way, the system provides fine-grained control over when re-rasterization must be performed. Sixth, in displays where the layout of light-emitting elements varies across regions (e.g., due to curvature of the multiscopic display and/or an optical combiner, or lens discontinuities), angular deviation checking ensures localized correctness of reused renderings.

Furthermore, optionally, the at least one processor is configured to:

determine a distance between the given eye and the position of the graphical element in the 3D view frustum;

determine a scaling factor for the graphical element based on the distance between the given eye and the position of the graphical element in the 3D view frustum;

store, for the graphical element, the scaling factor in addition to the computed colour values for the light-emitting elements in the set and the cadence information;

determine a current or predicted distance between the given eye and the position of the graphical element in the updated 3D view frustum;

determine a current or predicted scaling factor for the graphical element based on the current or predicted distance between the given eye and the position of the graphical element in the updated 3D view frustum;

determine whether a difference between the current or predicted scaling factor and the stored scaling factor exceeds a predefined scaling threshold; and when it is determined that the difference exceeds the predefined scaling threshold, re-rasterize the graphical element onto the another set of light-emitting elements based at least on relative perceived positions of the light-emitting elements in the another set from the perspective of the given eye, and a perceived shape and a perceived angular size of each light-emitting element in the another set, wherein the another set of light-emitting elements in the array to be employed to display the graphical element to the given eye is identified based further on the current or predicted scaling factor; and compute a colour value for each light-emitting element in the another set based on the re-rasterization of the graphical element.

In this regard, the system optionally supports scaling-aware rasterization reuse by incorporating a scaling factor derived from the distance between the given eye and the position of the graphical element. This scaling factor supplements the cadence-based reuse gating mechanism, allowing the system to determine when a change in viewing distance has caused perceptual distortion significant enough to warrant re-rasterization. Moreover, this mechanism adds a depth-sensitive constraint to the reuse process, complementing the cadence-based reuse gating mechanism and optionally the viewing-direction-based reuse gating mechanism, to ensure perceptual consistency in all three spatial dimensions.

The distance between the given eye and the position of the graphical element in the 3D view frustum may be computed as a Euclidean distance from the position of the given eye to a reference point on the graphical element, such as a centroid of its 3D bounding volume or a point of visual fixation. Using this distance, the system determines the scaling factor that defines how large or small the graphical element should appear from the given eye. The scaling factor may be computed using a linear or non-linear projection model. For example, it may be defined as a ratio of the distance to a reference distance, or as a calibrated function derived from perceptual or display-specific tuning data.

The system stores this scaling factor along with the computed colour values and the cadence information for the graphical element. The stored scaling factor may be stored along with the cadence information as metadata in the lookup structure used for reuse.

When the location of the given eye changes, the 3D view frustum is updated, and the current or predicted distance between the given eye and the graphical element is computed. Using this updated distance, the current or predicted scaling factor is determined. This current or predicted scaling factor is then compared with the previously-stored scaling factor. If the difference between them exceeds the predefined scaling threshold, reuse is disallowed. The predefined scaling threshold may be defined as an absolute or percentage difference in scale, or as a perceptual tolerance (such as one that corresponds to a visible size difference on the retina or in the display's angular rendering space). As an example, the predefined scaling threshold may correspond to a size variation of 5 to 10 percent in apparent angular extent. As another example, the predefined scaling threshold may correspond to a fixed deviation in perceived retinal size based on empirical tuning.

If the difference exceeds the predefined scaling threshold, the graphical element is re-rasterized onto the another set of light-emitting elements. Accordingly, the graphical element is rasterized anew, as previously described, and new colour values are computed for the another set of light-emitting elements based on the re-rasterization. Notably, the another set may differ in size from the original set, as the graphical element may need to be enlarged or shrunk to preserve the intended depth illusion when the user moves closer to or farther from the display. A synthetic light field produced using the new colour values thus reflects the corrected appearance of the graphical element for the updated scaling factor.

Otherwise, if the difference does not exceed the predefined scaling threshold, the stored colour values may still be reused, provided other criteria (like cadence similarity) are satisfied.

The scaling-aware rasterization reuse approach has several technical benefits. First, by gating reuse based on the difference in scaling factor, the system ensures that graphical elements are displayed with accurate apparent size under dynamic changes in distance between the location of the user's eye and the intended position of the graphical element in the 3D view frustum. Second, this approach avoids visual artifacts such as under-scaling or over-scaling that may result from reusing previously-computed colour values without accounting for distance-induced scale changes, thus preserving clarity of text, icons, and UI elements. Third, the scaling-aware reuse gating mechanism complements the cadence-based reuse gating mechanism, forming a more complete perceptual validation for reuse under motion or depth changes. Fourth, this approach supports dynamic depth adaptation in environments such as automotive HUDs, where the user's viewpoint may move along the depth axis without lateral displacement. Fifth, it improves rendering fidelity without sacrificing performance by avoiding unnecessary re-rasterization when distance-induced scaling changes are below perceptual thresholds. Sixth, it supports applications requiring high angular and spatial accuracy, such as foveated rendering or gaze-contingent UI systems, where scaling mismatches can be visually disruptive. Seventh, this reuse gating approach can be integrated into a broader rendering control framework, allowing adaptive rendering strategies to be applied based on system latency, power constraints, or visual sensitivity.

Alternatively, optionally, the graphical element may continue to be displayed at a fixed size in terms of the number of light-emitting elements, even if this results in a change in its apparent size from the user's perspective. For instance, in the case of text rendering, this is often an acceptable trade-off, as text glyphs are not strictly anchored to precise 3D positions. Instead, readability and approximate placement within a general display region typically take precedence.

Furthermore, optionally, a plurality of graphical elements correspond to respective glyphs in a text string, wherein the at least one processor is configured to:
- identify, for each graphical element from among the plurality of graphical elements, a corresponding set of light-emitting elements in the array to be employed to display said graphical element to the given eye, based on a position of said graphical element in the 3D view frustum;
- determine, for each light-emitting element in the corresponding set, a perceived shape and a perceived angular size of said light-emitting element from the perspective of the given eye;
- rasterize said graphical element onto the corresponding set of light-emitting elements;
- compute a colour value for each light-emitting element in the corresponding set based on the rasterization of said graphical element;
- store, for said graphical element, computed colour values for the light-emitting elements in the corresponding set, along with cadence information indicating a corresponding reference cadence of a reference light-emitting element in the corresponding set with respect to a corresponding multiscopic cell;
- identify another corresponding set of light-emitting elements in the array to be employed to display said graphical element to the given eye, based on the position of said graphical element in the updated 3D view frustum;
- determine whether a cadence of a corresponding light-emitting element in the another corresponding set with respect to another corresponding multiscopic cell matches the corresponding reference cadence within the predefined similarity threshold; and
- when it is determined that the cadence of the corresponding light-emitting element in the another corresponding set matches the corresponding reference cadence within the predefined similarity threshold, reuse the stored colour values for the light-emitting elements of the another corresponding set to display said graphical element to the given eye.

It will be appreciated that the aforementioned steps can be performed for each of the plurality of graphical elements, as described earlier. Herein, each graphical element corresponds to a respective glyph in the text string. For each graphical element (namely, each glyph), a corresponding set of light-emitting elements to be employed to display said graphical element (namely, said glyph) to the given eye is identified based on the position of said graphical element in the 3D view frustum. For each light-emitting element in the corresponding set, a perceived shape and a perceived angular size are determined from the perspective of the given eye, and said graphical element (namely, said glyph) is rasterized accordingly onto the corresponding set. A colour value is computed for each light-emitting element in the corresponding set based on the rasterization. For each graphical element (namely, each glyph), the computed colour values, along with cadence information indicating a reference cadence of a reference light-emitting element in the corresponding set with respect to the corresponding multiscopic cell, are stored for reuse. When a viewpoint change results in the updated 3D view frustum, another set of light-emitting elements corresponding to each graphical element (namely, each glyph) is identified, and it is determined whether the cadence of the corresponding light-emitting element in the another set matches the reference cadence within the predefined similarity threshold. If the cadence matches, the stored colour values for said graphical element (namely, said glyph) are reused to drive the light-emitting elements of the another set. Furthermore, each glyph can be handled independently. In other words, re-rasterization may be performed only for a subset of the glyphs in the text string, and only when the reuse conditions for those specific glyphs are not satisfied.

The reuse mechanism applied across multiple glyphs in a text string enables scalable and efficient rendering of textual content under dynamic user viewpoints. By storing and selectively reusing glyph-specific colour values and cadence metadata, the system maintains consistent alignment, angular sampling, and visual sharpness of each glyph despite motion-induced shifts in the location of the given eye. This results in perceptually coherent text presentation across an entire text string, including for dense or high-resolution fonts. This approach substantially reduces redundant rasterization, improving computational efficiency in multiscopic display systems, especially in latency-sensitive or resource-constrained applications such as automotive HUDs.

Additionally, optionally, the at least one processor is configured to:
- when it is determined that the cadence of the corresponding light-emitting element in the another corresponding set does not match the corresponding reference cadence within the predefined similarity threshold,
  - search for a further corresponding set of light-emitting elements in the array to be employed to display said graphical element to the given eye, in place of the another corresponding set of light-emitting elements, wherein:
    - (i) a cadence of a corresponding light-emitting element in the further corresponding set with respect to a corresponding multiscopic cell matches the corresponding reference cadence within the predefined similarity threshold, and
    - (ii) the further corresponding set of light-emitting elements lies within the predefined spatial distance threshold from the another corresponding set of light-emitting elements; and
  - reuse the stored colour values for the light-emitting elements of the further corresponding set to display said graphical element to the given eye.

It will be appreciated that the cadence-based reuse gating mechanism described earlier can be performed for each graphical element in the text string. When the cadence of the corresponding light-emitting element in the another corresponding set does not match the previously-stored corresponding reference cadence within the predefined similarity threshold, the system optionally searches for a further corresponding set of light-emitting elements to display the graphical element. This further corresponding set is selected such that: (i) the cadence of the corresponding light-emitting element in the further corresponding set matches the corresponding reference cadence within the predefined similarity threshold, and (ii) the further corresponding set lies within the predefined spatial distance threshold from the another corresponding set. If both conditions are satisfied, the stored colour values for the graphical element are reused to drive the light-emitting elements in the further corresponding set, avoiding re-rasterization. Similarly, if the text string is moved around, each glyph can be snapped to suitable locations separately. As a result, the entire text string can be repositioned at sub-lenticular granularity while still leveraging reuse wherever the cadence and proximity constraints are satisfied.

By extending the reuse fallback mechanism to each glyph in a text string, the system reduces redundant rasterization of individual glyphs under minor viewpoint shifts. This enables perceptually stable and computationally efficient text rendering, particularly in dense or large-scale text layouts. The cadence- and proximity-aware fallback mechanism supports localized reuse, enhancing responsiveness in latency-sensitive multiscopic applications like automotive HUDs, without sacrificing visual coherence across the text string.

Moreover, optionally, the at least one processor is configured to:
  determine a second 3D view frustum corresponding to another eye of the at least one user, based on a current or predicted relative location of the another eye with respect to the image plane;
  identify a second set of light-emitting elements in the array to be employed to display the graphical element to the another eye, based on a position of the graphical element in the second 3D view frustum;
  determine whether a cadence of a corresponding light-emitting element in the second set with respect to a corresponding multiscopic cell matches the reference cadence of the reference light-emitting element in the set within a predefined similarity threshold; and
  when it is determined that the cadence of the corresponding light-emitting element in the second set matches the reference cadence within the predefined similarity threshold, reuse the stored colour values for the light-emitting elements of the second set to display the graphical element to the another eye.

The system optionally enables reuse of stored colour values (namely, stored rasterization results) across both eyes of a user or across eyes of different users by evaluating cadence match. When the cadence matches the previously-stored reference cadence within the predefined similarity threshold, the stored colour values for the graphical element are reused to drive the light-emitting elements of the second set, avoiding re-rasterization. Otherwise, the graphical element is rasterized anew for the another eye.

By enabling cadence-based reuse across different eyes, the system significantly reduces redundant rasterization and ensures consistent visual presentation across stereo views. This cross-eye reuse mechanism maintains angular sampling alignment, preventing stereo mismatch and preserving depth fidelity. It enhances performance efficiency, especially in resource-constrained or multi-user environments, and supports stable binocular rendering with reduced latency and computational cost, critical for multiscopic HUD systems.

Furthermore, optionally, the at least one processor is configured to:
  predict a future relative location of the given eye with respect to the image plane;
  determine a future 3D view frustum corresponding to the given eye, based on the future relative location;
  identify a future set of light-emitting elements in the array to be employed to display the graphical element to the given eye at a future time instant, based on a position of the graphical element in the future 3D view frustum;
  determine, for each light-emitting element in the future set, a perceived shape and a perceived angular size of said light-emitting element from a perspective of the given eye, based on the future relative location and optical distortion parameters of the multiscopic optical element;
  rasterize the graphical element onto the future set of light-emitting elements based at least on relative perceived positions of the light-emitting elements in the future set from the perspective of the given eye, and the perceived shape and the perceived angular size of each light-emitting element in the future set;
  compute a colour value for each light-emitting element in the future set based on the rasterization of the graphical element;
  store, for the graphical element, computed colour values for the light-emitting elements in the future set, along with cadence information indicating a future reference cadence of a reference light-emitting element in the future set with respect to a multiscopic cell;
  update the future 3D view frustum corresponding to the given eye, based on a current relative location of the given eye with respect to the image plane;
  identify a current set of light-emitting elements in the array to be employed to display the graphical element to the given eye at a current time instant, based on the position of the graphical element in the updated future 3D view frustum;
  determine whether a cadence of a corresponding light-emitting element in the current set with respect to a corresponding multiscopic cell matches the future reference cadence of the reference light-emitting element in the future set within another predefined similarity threshold; and
  when it is determined that the cadence of the corresponding light-emitting element in the current set matches the future reference cadence within the another predefined similarity threshold, reuse the stored colour values for the light-emitting elements of the current set to display the graphical element to the given eye at the current time instant.

The system optionally supports predictive rasterization and reuse by anticipating changes in the user's viewing geometry. The future relative location of the given eye with respect to the image plane is predicted based on previous relative locations of the given eye over a given time period. Such prediction can be performed using predictive filtering models. Using the future relative location, the future 3D view frustum corresponding to the given eye is determined. Based on the position of the graphical element in the future 3D view frustum, the future set of light-emitting elements in the array is identified. For each light-emitting element in this future set, a perceived shape and a perceived angular size are computed from the perspective of the given eye, based on the future relative location and the optical distortion parameters of the multiscopic optical element. The graphical element is rasterized onto the future set of light-emitting elements, taking into account the relative perceived positions, perceived shapes, and perceived angular sizes, as described earlier. Colour values are then computed for each light-emitting element in the future set based on the rasterization. These colour values, along with the cadence information indicating the future reference cadence of the reference light-emitting element in the future set with respect to the multiscopic cell, are stored for the graphical element.

At a current time instant, the future 3D view frustum is updated based on the actual (current) relative location of the given eye. The current set of light-emitting elements is identified from the position of the graphical element in this updated future 3D view frustum. A cadence comparison is made between the corresponding light-emitting element in the current set and the previously-stored future reference cadence. If the cadence matches within the another predefined similarity threshold, the previously-stored colour values are reused to display the graphical element using the current set. Otherwise, re-rasterization is performed as described earlier. The another predefined similarity threshold may be same as or different from the predefined similarity threshold.

By incorporating predictive rasterization based on the future relative location of the given eye, the system proactively prepares rasterization results that may be reused in subsequent frames. This reduces latency and computational overhead during real-time updates, which is especially beneficial in high-motion scenarios or systems with constrained frame budgets. The cadence-based gating ensures that reuse of these predictive results only occurs when the optical alignment remains perceptually consistent, thereby preserving visual fidelity. Moreover, this approach enables frame lookahead in rendering pipelines, facilitating asynchronous or pre-emptive rendering strategies that improve system responsiveness. It enhances stability in dynamic environments, such as automotive HUDs equipped with head-tracking or gaze-prediction modules, by mitigating the need for repeated rasterization under minor or anticipated viewpoint shifts. As a result, rasterization results remain valid over longer temporal intervals, extending the utility of previously-computed rasterization results and enabling more efficient rendering under time-varying user motion.

Moreover, optionally, the another set of light-emitting elements in the array is vertically offset from the set of light-emitting elements in the array by a distance within a predefined vertical offset threshold. In some implementations, when determining whether the stored colour values can be reused for the graphical element, the system optionally considers a vertical spatial relationship between the previously-identified set of light-emitting elements and the newly-identified another set of light-emitting elements. Specifically, the another set is deemed eligible for reuse when it is vertically offset from the set by a distance that lies within the predefined vertical offset threshold.

The vertical offset may be measured in physical units (e.g., micrometres), in display-specific coordinates (e.g., light-emitting element indices), or as an angular displacement from the perspective of the given eye. The predefined vertical offset threshold may be determined based on perceptual tolerance limits, display layout granularity, or system-specific reuse constraints.

The vertical offset can be evaluated with respect to the predefined vertical offset threshold during cadence matching and reuse gating. When identifying the another set based on the updated user viewpoint, the system can leverage a vertical offset between the another set and the set. If the vertical offset lies within the predefined vertical offset threshold, and cadence similarity is satisfied, then the stored colour values are reused for the another set without requiring re-rasterization. This is beneficial due to a fact that the effective vertical resolution of a lenticular array-based multiscopic display is significantly higher than in the horizontal direction. This is because light intended for the given eye, when passing through a single lenticule, is emitted from a narrow horizontal zone spanning only a few light-emitting elements, while leaving the vertical direction unaffected. As a result, shifting the graphical element by a few light-emitting elements up or down has minimal perceptual impact but may improve the apparent image quality due to a better rasterization fit with the new geometry.

By introducing a vertical offset constraint into the reuse decision process, the system accounts for tolerance to minor vertical shifts that do not perceptually affect the angular appearance of the graphical element. This enables localized reuse under small head or eye movements, particularly in multiscopic display arrangements where rows of light-emitting elements may have vertical periodicity.

This mechanism supports finer-grained control over reuse eligibility, balancing performance and perceptual fidelity. It prevents re-rasterization in cases where vertical displacement is negligible from the user's perspective, thus reducing computational workload. Furthermore, it aligns with the structure of multiscopic displays where reuse across vertically adjacent light-emitting elements may be visually acceptable due to the optical characteristics of the multiscopic cell (e.g., lenticular or directional lenses). As a result, the system achieves greater rasterization efficiency while maintaining visual consistency under constrained vertical movement.

Furthermore, optionally, the at least one processor is configured to:
- determine a gaze direction of each eye of the at least one user, using the tracker;
- determine whether the at least one user is looking at the graphical element, based on the gaze direction of either eye or each eye of the at least one user; and
- when it is determined that the at least one user is looking at the graphical element, reduce the predefined similarity threshold used for determining whether the cadence of the corresponding light-emitting element in the another set matches the reference cadence.

The system optionally incorporates gaze-contingent reuse gating by utilizing the tracker to determine the gaze direction of each eye of the at least one user in real-time or near real-time. It can be determined whether the at least one user is looking at the graphical element, by comparing the gaze direction with the angular region subtended by the graphical element, based on the current or predicted relative location of either eye or each eye and the spatial position of the graphical element in the 3D view frustum.

When it is determined that either eye (or both) is currently directed toward the graphical element, the predefined similarity threshold used to determine cadence match between the corresponding light-emitting element in the another set and the previously-stored reference cadence is reduced. This tighter threshold enforces stricter cadence similarity criteria for reuse decisions.

As a result, the system increases the likelihood of re-rasterizing the graphical element (rather than reusing previously-computed colour values) when the user is directly looking at the graphical element. If the user is not looking at the graphical element, the original, looser similarity threshold may still be used, thereby relaxing the cadence reuse constraint for peripheral or non-gaze-targeted elements.

This gaze-contingent adjustment of the predefined similarity threshold improves perceptual fidelity for graphical elements under direct visual scrutiny. By reducing the predefined similarity threshold when the user is looking directly at the graphical element, the system ensures that only near-exact cadence matches are permitted for reuse, thereby minimizing aliasing, sampling-phase mismatch, or parallax errors in foveal vision. This enhances clarity and sharpness for content under gaze focus, which is especially critical for reading text, interpreting symbols, or interacting with precision-based UI elements.

At the same time, by relaxing the cadence constraint when the user is not looking at the graphical element, the system conserves computational resources by favouring reuse in peripheral regions where strict visual accuracy is less important. This gaze-adaptive reuse approach achieves a dynamic balance between performance and quality, supporting perceptual prioritization in rendering pipelines. It is particularly valuable in automotive HUDs or high-resolution multiscopic interfaces where visual load and resource efficiency must be carefully managed.

Alternatively, optionally, the at least one processor is configured to:
  determine a gaze direction of each eye of the at least one user, using the tracker;
  determine whether the at least one user is looking at the graphical element, based on the gaze direction of either eye or each eye of the at least one user; and
  when it is determined that the at least one user is looking at the graphical element,
    bypass reuse of the stored colour values;
    re-rasterize the graphical element onto the another set of light-emitting elements; and
    compute a colour value for each light-emitting element in the another set based on the re-rasterization of the graphical element.

When it is determined that the graphical element is under direct visual attention (i.e., within the user's gaze region), the system bypasses any cadence-based reuse logic. Specifically, it disables reuse of previously-computed colour values and instead triggers re-rasterization of the graphical element for the updated viewpoint. The graphical element is rasterized anew onto the another set of light-emitting elements corresponding to the updated 3D view frustum. For each light-emitting element in the another set, a colour value is computed based on the rasterization, as described previously.

This binary gating approach, triggering immediate re-rasterization upon gaze contingency, serves as a strict safeguard to ensure that visual fidelity is always preserved for gaze-targeted elements. This approach provides uncompromising perceptual accuracy by guaranteeing that any graphical element under user's gaze is freshly rasterized, regardless of cadence similarity. This eliminates the risk of reusing outdated or perceptually misaligned data in critical regions of visual attention. It ensures high clarity and spatial consistency in the foveal region, supporting sharp rendering of text, symbols, and UI elements directly observed by the user.

This approach also simplifies reuse logic by replacing threshold comparisons with a binary gaze condition, improving predictability in reuse decisions. It is especially advantageous in applications where safety, clarity, or attention accuracy is paramount, such as automotive HUDs, where errors in gaze-targeted rendering can lead to misinterpretation or missed information.

At the same time, the system continues to leverage cadence-based reuse for all non-gaze-targeted elements, preserving efficiency in peripheral regions. Thus, this approach supports a hybrid strategy: full-fidelity rendering where needed, and reuse-based optimization elsewhere, balancing computational load with perceptual relevance.

For illustration purposes only, there will now be described how various components of the system can be implemented. The at least one processor controls an overall operation of the system. The at least one processor is communicably coupled to the tracker and the multiscopic display. Optionally, the at least one processor is implemented as a processor of the multiscopic display. Alternatively, optionally, the at least one processor is implemented as a processor of a computing device that is communicably coupled to the multiscopic display. Examples of the computing device include, but are not limited to, a laptop, a desktop, a tablet, a phablet, a personal digital assistant, a workstation, and a console. Examples of the processor include, but are not limited to, GPU, CPU and ASIC. Additionally, optionally, the at least one processor is implemented at least in part as a cloud server (namely, a remote server) that provides a cloud computing service.

Throughout the present disclosure, the term "tracker" refers to a specialised equipment for detecting and/or tracking relative locations of eyes of a given user. In some implementations, the tracker is also used for determining gaze directions of the user's eyes. Optionally, the tracker is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (namely, the at least one visible-light camera, the at least one IR camera, the at least one depth camera) may be utilised in the tracker. When different types of images captured by the various different types of tracking cameras are utilised, the relative location of the user's eyes can be determined highly accurately, as results obtained from one type of image can be used to refine results obtained from another type of image. Herein, these different types of images constitute the tracking data collected by the tracker, and may be in the form of at least one of: visible-light images, IR images, depth images. It will be appreciated that the tracker tracks both eyes of the at least one user with a significantly high accuracy and precision, such that an error in determining the relative locations may, for example, be minimised to within a tolerance range of approximately (+/−) 8 millimetres.

Pursuant to embodiments of the present disclosure, different types of multiscopic displays can be implemented. For example, the multiscopic display can be any one of: hogel-based, lenticular array-based, parallax barrier-based. Depending on the type of the multiscopic display, the multiscopic optical element can be a lenticular array, a parallax barrier, or similar. The term "multiscopic cell" encompasses both a lenticular lens in a lenticular array and a transparent portion in a parallax barrier.

The term "light-emitting element" as used herein refers to any individually controllable emitter in the multiscopic display, including pixels, subpixels, or other display sampling units (such as emissive samples in a multisampling configuration). Although the reuse mechanisms described herein are particularly beneficial in multiscopic displays that include subpixel arrangements (such as RGB stripe or delta layouts), they are also applicable to displays without subpixels, such as monochrome displays or those using time-sequential colour (e.g., colour wheel backlit systems).

The image plane of the multiscopic display can be a light-emitting surface of the multiscopic display or an imaginary plane that is parallel to the light-emitting surface, in a case where the multiscopic display is being directly viewed. Alternatively, the image plane can be an imaginary plane in another case where the optical combiner is employed to facilitate a reflected view. The term "image plane" refers to an intended location in space where the graphical element is perceived. This does not require the multiscopic display or other optical elements on the optical path to be physically planar. This definition applies irrespective of the optical configuration of the system, namely:
  (i) in a case where a distorted image is displayed on a curved or non-curved display and reflected through a curved combiner,
  (ii) in a case where an undistorted image is displayed on a non-curved display and reflected through a non-curved combiner,
  (iii) in a case where an image is displayed on the multiscopic display and viewed directly (without any optical combiner).

The present disclosure also relates to the method as described above. Various embodiments and variants disclosed above, with respect to the aforementioned first aspect, apply mutatis mutandis to the method.

In some implementations, the method further comprises:
  when it is determined that the cadence of the corresponding light-emitting element in the another set does not match the reference cadence within the predefined similarity threshold,
    re-rasterizing the graphical element onto the another set of light-emitting elements based at least on relative perceived positions of the light-emitting elements in the another set from the perspective of the given eye, and a perceived shape and a perceived angular size of each light-emitting element in the another set; and
    computing a colour value for each light-emitting element in the another set based on the re-rasterization of the graphical element.

In other implementations, the method further comprises:
  when it is determined that the cadence of the corresponding light-emitting element in the another set does not match the reference cadence within the predefined similarity threshold,
    searching for a further set of light-emitting elements in the array to be employed to display the graphical element to the given eye, in place of the another set of light-emitting elements, wherein:
      (i) a cadence of a corresponding light-emitting element in the further set with respect to a corresponding multiscopic cell matches the reference cadence within the predefined similarity threshold, and
      (ii) the further set of light-emitting elements lies within a predefined spatial distance threshold from the another set of light-emitting elements; and
    reusing the stored colour values for the light-emitting elements of the further set to display the graphical element to the given eye.

By enabling rasterization reuse across small shifts in user viewpoint, while still enforcing cadence compatibility and spatial proximity constraints, unnecessary re-rasterization are reduced during minor eye movements.

This improves computational efficiency and perceptual stability in dynamic environments such as HUDs, where even slight user motion could otherwise trigger costly rendering operations.

Moreover, optionally, the method further comprises:
  determining a viewing direction from the given eye toward the set of light-emitting elements, based on the relative location of the given eye with respect to the image plane and a position of the set of light-emitting elements in the array;
  storing, for the graphical element, the viewing direction in addition to the computed colour values for the light-emitting elements in the set and the cadence information;
  determining a current or predicted viewing direction from the given eye toward the another set of light-emitting elements, based on the current or predicted relative location of the given eye with respect to the image plane and a position of the another set of light-emitting elements in the array;
  determining whether an angular deviation between the current or predicted viewing direction and the stored viewing direction exceeds a predefined angular threshold; and
  when it is determined that the angular deviation exceeds the predefined angular threshold,
    re-rasterizing the graphical element onto the another set of light-emitting elements based at least on relative perceived positions of the light-emitting elements in the another set from the perspective of the given eye, and a perceived shape and a perceived angular size of each light-emitting element in the another set; and
    computing a colour value for each light-emitting element in the another set based on the re-rasterization of the graphical element.

By gating reuse based on the angular deviation between the viewing directions, the method prevents reuse when the user's eye has shifted significantly, thereby avoiding visual artifacts such as angular aliasing or parallax errors. This enhances perceptual coherence and preserves spatial precision for sharp features, even under rapid eye movements or jitter. The angular deviation constraint complements cadence matching to ensure reuse occurs only under perceptually consistent viewing geometry.

Furthermore, optionally, the method further comprises:
  determining a distance between the given eye and the position of the graphical element in the 3D view frustum;
  determining a scaling factor for the graphical element based on the distance between the given eye and the position of the graphical element in the 3D view frustum;
  storing, for the graphical element, the scaling factor in addition to the computed colour values for the light-emitting elements in the set and the cadence information;
  determining a current or predicted distance between the given eye and the position of the graphical element in the updated 3D view frustum;
  determining a current or predicted scaling factor for the graphical element based on the current or predicted distance between the given eye and the position of the graphical element in the updated 3D view frustum;
  determining whether a difference between the current or predicted scaling factor and the stored scaling factor exceeds a predefined scaling threshold; and when it is determined that the difference exceeds the predefined scaling threshold,
   re-rasterizing the graphical element onto the another set of light-emitting elements based at least on relative perceived positions of the light-emitting elements in the another set from the perspective of the given eye, and a perceived shape and a perceived angular size of each light-emitting element in the another set, wherein the another set of light-emitting elements in the array to be employed to display the graphical element to the given eye is identified based further on the current or predicted scaling factor; and
   computing a colour value for each light-emitting element in the another set based on the re-rasterization of the graphical element.

By gating reuse based on differences in the scaling factor, the method ensures that graphical elements maintain accurate apparent size despite changes in the viewing distance. This avoids under- or over-scaling artifacts, preserving clarity in UI elements and text. The scaling-aware gating complements cadence-based reuse, enabling perceptually accurate rendering across depth variations without incurring unnecessary re-rasterization.

Moreover, optionally, a plurality of graphical elements correspond to respective glyphs in a text string, wherein the method further comprises:
   identifying, for each graphical element from among the plurality of graphical elements, a corresponding set of light-emitting elements in the array to be employed to display said graphical element to the given eye, based on a position of said graphical element in the 3D view frustum;
   determining, for each light-emitting element in the corresponding set, a perceived shape and a perceived angular size of said light-emitting element from the perspective of the given eye;
   rasterizing said graphical element onto the corresponding set of light-emitting elements;
   computing a colour value for each light-emitting element in the corresponding set based on the rasterization of said graphical element;
   storing, for said graphical element, computed colour values for the light-emitting elements in the corresponding set, along with cadence information indicating a corresponding reference cadence of a reference light-emitting element in the corresponding set with respect to a corresponding multiscopic cell;
   identifying another corresponding set of light-emitting elements in the array to be employed to display said graphical element to the given eye, based on the position of said graphical element in the updated 3D view frustum;
   determining whether a cadence of a corresponding light-emitting element in the another corresponding set with respect to another corresponding multiscopic cell matches the corresponding reference cadence within the predefined similarity threshold; and
   when it is determined that the cadence of the corresponding light-emitting element in the another corresponding set matches the corresponding reference cadence within the predefined similarity threshold, reusing the stored colour values for the light-emitting elements of the another corresponding set to display said graphical element to the given eye.

By enabling reuse of glyph-specific rasterization results across a text string, the method supports efficient and scalable text rendering under changing user viewpoints. It maintains consistent alignment and visual sharpness of each glyph, ensuring perceptually coherent presentation even in dense or high-resolution layouts. This reduces redundant rasterization and improves efficiency in latency-sensitive contexts such as automotive HUDs.

Additionally, optionally, the method further comprises:
   when it is determined that the cadence of the corresponding light-emitting element in the another corresponding set does not match the corresponding reference cadence within the predefined similarity threshold,
      searching for a further corresponding set of light-emitting elements in the array to be employed to display said graphical element to the given eye, in place of the another corresponding set of light-emitting elements, wherein:
         (i) a cadence of a corresponding light-emitting element in the further corresponding set with respect to a corresponding multiscopic cell matches the corresponding reference cadence within the predefined similarity threshold, and
         (ii) the further corresponding set of light-emitting elements lies within a predefined spatial distance threshold from the another corresponding set of light-emitting elements; and
      reusing the stored colour values for the light-emitting elements of the further corresponding set to display said graphical element to the given eye.

By applying cadence- and proximity-aware reuse fallback to individual glyphs in a text string, the method avoids redundant re-rasterization under minor viewpoint shifts. This enables perceptually stable and efficient text rendering across large or dense layouts, improving responsiveness in latency-sensitive multiscopic applications such as automotive HUDs.

Furthermore, optionally, the method further comprises:
   determining a second 3D view frustum corresponding to another eye of the at least one user, based on a current or predicted relative location of the another eye with respect to the image plane;
   identifying a second set of light-emitting elements in the array to be employed to display the graphical element to the another eye, based on a position of the graphical element in the second 3D view frustum;
   determining whether a cadence of a corresponding light-emitting element in the second set with respect to a corresponding multiscopic cell matches the reference cadence of the reference light-emitting element in the set within a predefined similarity threshold; and
   when it is determined that the cadence of the corresponding light-emitting element in the second set matches the reference cadence within the predefined similarity threshold, reusing the stored colour values for the light-emitting elements of the second set to display the graphical element to the another eye.

By enabling cadence-based reuse across different eyes, redundant re-rasterization is reduced while maintaining angular sampling consistency between stereo views. This preserves depth fidelity and supports stable binocular rendering with lower latency and computational cost, which is especially beneficial in multiscopic HUD applications and resource-constrained environments.

Moreover, optionally, the method further comprises:
   predicting a future relative location of the given eye with respect to the image plane;
   determining a future 3D view frustum corresponding to the given eye, based on the future relative location;

identifying a future set of light-emitting elements in the array to be employed to display the graphical element to the given eye at a future time instant, based on a position of the graphical element in the future 3D view frustum;

determining, for each light-emitting element in the future set, a perceived shape and a perceived angular size of said light-emitting element from a perspective of the given eye, based on the future relative location and optical distortion parameters of the multiscopic optical element;

rasterizing the graphical element onto the future set of light-emitting elements based at least on relative perceived positions of the light-emitting elements in the future set from the perspective of the given eye, and the perceived shape and the perceived angular size of each light-emitting element in the future set;

computing a colour value for each light-emitting element in the future set based on the rasterization of the graphical element;

storing, for the graphical element, computed colour values for the light-emitting elements in the future set, along with cadence information indicating a future reference cadence of a reference light-emitting element in the future set with respect to a multiscopic cell;

updating the future 3D view frustum corresponding to the given eye, based on a current relative location of the given eye with respect to the image plane;

identifying a current set of light-emitting elements in the array to be employed to display the graphical element to the given eye at a current time instant, based on the position of the graphical element in the updated future 3D view frustum;

determining whether a cadence of a corresponding light-emitting element in the current set with respect to a corresponding multiscopic cell matches the future reference cadence of the reference light-emitting element in the future set within another predefined similarity threshold; and when it is determined that the cadence of the corresponding light-emitting element in the current set matches the future reference cadence within the another predefined similarity threshold, reusing the stored colour values for the light-emitting elements of the current set to display the graphical element to the given eye at the current time instant.

By incorporating predictive rasterization based on the future relative location of the eye, unnecessary rasterization is reduced by proactively preparing reusable results for anticipated viewpoints. This lowers latency and improves responsiveness in dynamic or high-motion environments such as automotive HUDs. Cadence-based gating ensures that predictive reuse maintains visual fidelity by permitting reuse only when optical alignment remains perceptually consistent.

Moreover, optionally, the another set of light-emitting elements in the array is vertically offset from the set of light-emitting elements in the array by a distance within a predefined vertical offset threshold. By introducing a vertical offset constraint, rasterization reuse is selectively permitted under minor vertical shifts that do not perceptually affect graphical appearance. This reduces unnecessary re-rasterization due to small vertical displacements, improving efficiency while preserving visual consistency. The approach is especially effective in multiscopic displays with vertical periodicity in their light-emitting element layout.

Furthermore, optionally, the method further comprises:

determining a gaze direction of each eye of the at least one user, using the tracker;

determining whether the at least one user is looking at the graphical element, based on the gaze direction of either eye or each eye of the at least one user; and when it is determined that the at least one user is looking at the graphical element, reducing the predefined similarity threshold used for determining whether the cadence of the corresponding light-emitting element in the another set matches the reference cadence.

By tightening the cadence similarity threshold when the user is directly looking at a graphical element, perceptual fidelity is improved in foveal regions, minimizing visual artifacts such as aliasing or parallax errors.

Conversely, by relaxing the threshold in peripheral regions, computational efficiency is preserved without sacrificing perceived quality. This gaze-adaptive reuse approach enables balanced rendering performance in visually demanding environments such as multiscopic HUDs.

Alternatively, optionally, the method further comprises:

determining a gaze direction of each eye of the at least one user, using the tracker;

determining whether the at least one user is looking at the graphical element, based on the gaze direction of either eye or each eye of the at least one user; and when it is determined that the at least one user is looking at the graphical element, bypassing reuse of the stored colour values;

re-rasterizing the graphical element onto the another set of light-emitting elements; and computing a colour value for each light-emitting element in the another set based on the re-rasterization of the graphical element.

By enforcing mandatory re-rasterization for gaze-targeted graphical elements, this binary gating approach ensures uncompromising visual fidelity in the foveal region, eliminating risks of aliasing or misalignment. It simplifies reuse logic and enhances predictability by using a clear gaze condition, while still preserving efficiency through reuse in peripheral areas. This hybrid strategy is particularly suited for safety-critical applications like automotive HUDs, where clarity and attentional accuracy are essential.

DETAILED DESCRIPTION OF THE DRAWINGS

Figure 1B:
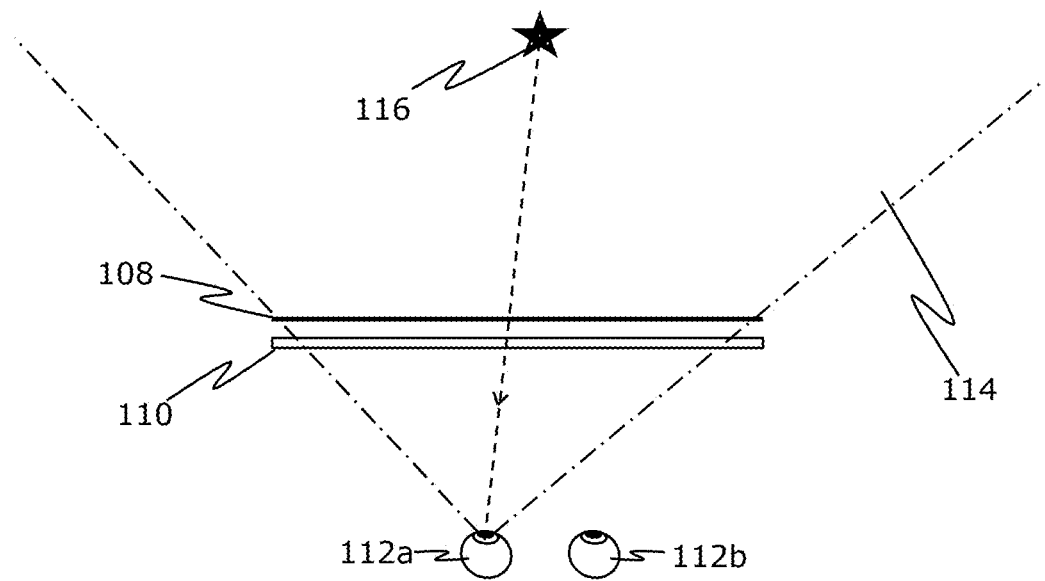

FIGS. 1A and 1B are schematic illustrations of a system 100 for performing rasterization and reusing rasterization results in a multiscopic display, in accordance with an embodiment of the present disclosure. The system 100 comprises a tracker 102, a multiscopic display 104, and at least one processor depicted as a processor 106. The multiscopic display 104 comprises an array 108 of light-emitting elements, and a multiscopic optical element 110 arranged on an optical path of the array 108 of light-emitting elements. The multiscopic optical element 110 comprises a plurality of multiscopic cells (not shown).

The processor 106 is configured to:

determine a relative location of each eye 112a-112b of at least one user with respect to an image plane of the multiscopic display 104, using the tracker 102;

determine a 3D view frustum 114 corresponding to a given eye 112a of the at least one user, based on a relative location of the given eye 112a with respect to the image plane;

identify a set of light-emitting elements in the array to be employed to display a graphical element 116 to the given eye 112a, based on a position of the graphical element 116 in the 3D view frustum 114;

determine, for each light-emitting element in the set, a perceived shape and a perceived angular size of said light-emitting element from a perspective of the given eye 112a, based on the relative location of the given eye 112a with respect to the image plane, and on optical distortion parameters of the multiscopic optical element 110;

rasterize the graphical element 116 onto the set of light-emitting elements based at least on relative perceived positions of the light-emitting elements in the set from the perspective of the given eye 112a, and the perceived shape and the perceived angular size of each light-emitting element in the set;

compute a colour value for each light-emitting element in the set based on the rasterization of the graphical element 116;

store, for the graphical element 116, computed colour values for the light-emitting elements in the set, along with cadence information indicating a reference cadence of a reference light-emitting element in the set with respect to a multiscopic cell;

update the 3D view frustum 114 corresponding to the given eye 112a, based on a current or predicted relative location of the given eye 112a with respect to the image plane;

identify another set of light-emitting elements in the array to be employed to display the graphical element 116 to the given eye 112a, based on the position of the graphical element 116 in the updated 3D view frustum 114;

determine whether a cadence of a corresponding light-emitting element in the another set with respect to another multiscopic cell matches the reference cadence of the reference light-emitting element in the set within a predefined similarity threshold; and when it is determined that the cadence of the corresponding light-emitting element in the another set matches the reference cadence within the predefined similarity threshold, reuse the stored colour values for the light-emitting elements of the another set to display the graphical element 116 to the given eye 112a.

Figure 1C:
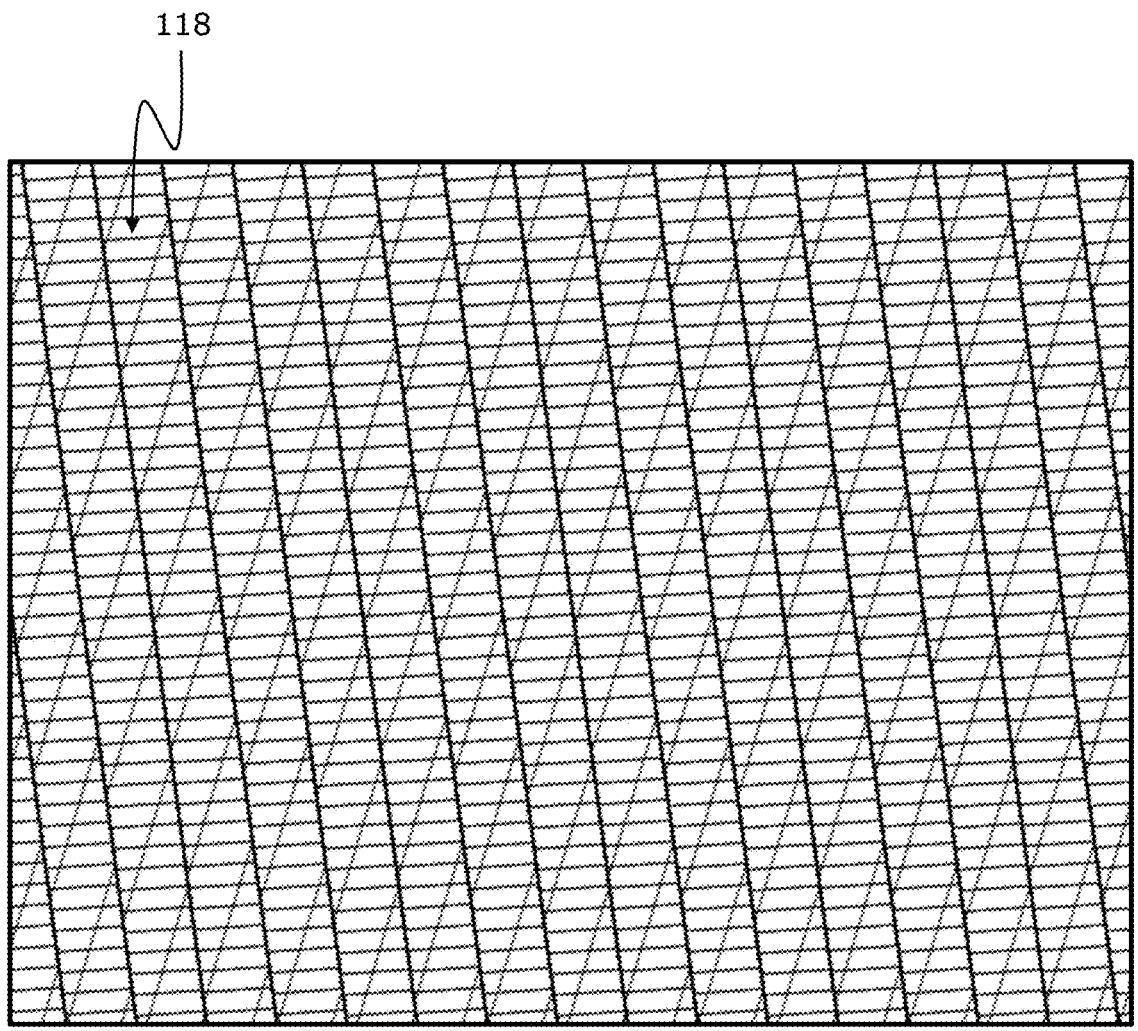

FIG. 1C is a schematic illustration of a portion of the array 108 as viewed by the given eye 112a through the multiscopic optical element 110, when the multiscopic optical element 110 is implemented as a lenticular array. Black slightly-tilted upright lines indicate borders between adjacent multiscopic cells, namely adjacent lenticular lenses. The portion of the array 108 has been shown to include light-emitting elements whose emitted light, upon passing through the multiscopic optical element 110, is directed toward the given eye 112a. For the sake of simplicity, these light-emitting elements have been shown without any significant optical distortion; in practical implementations, the light-emitting elements appear distorted due to the optical distortion parameters of the multiscopic optical element 110. The graphical element 116 is rasterized onto a set of light-emitting elements at a given time instant. A reference light-emitting element 118 of this set is marked in FIG. 1C.

Figure 1D:
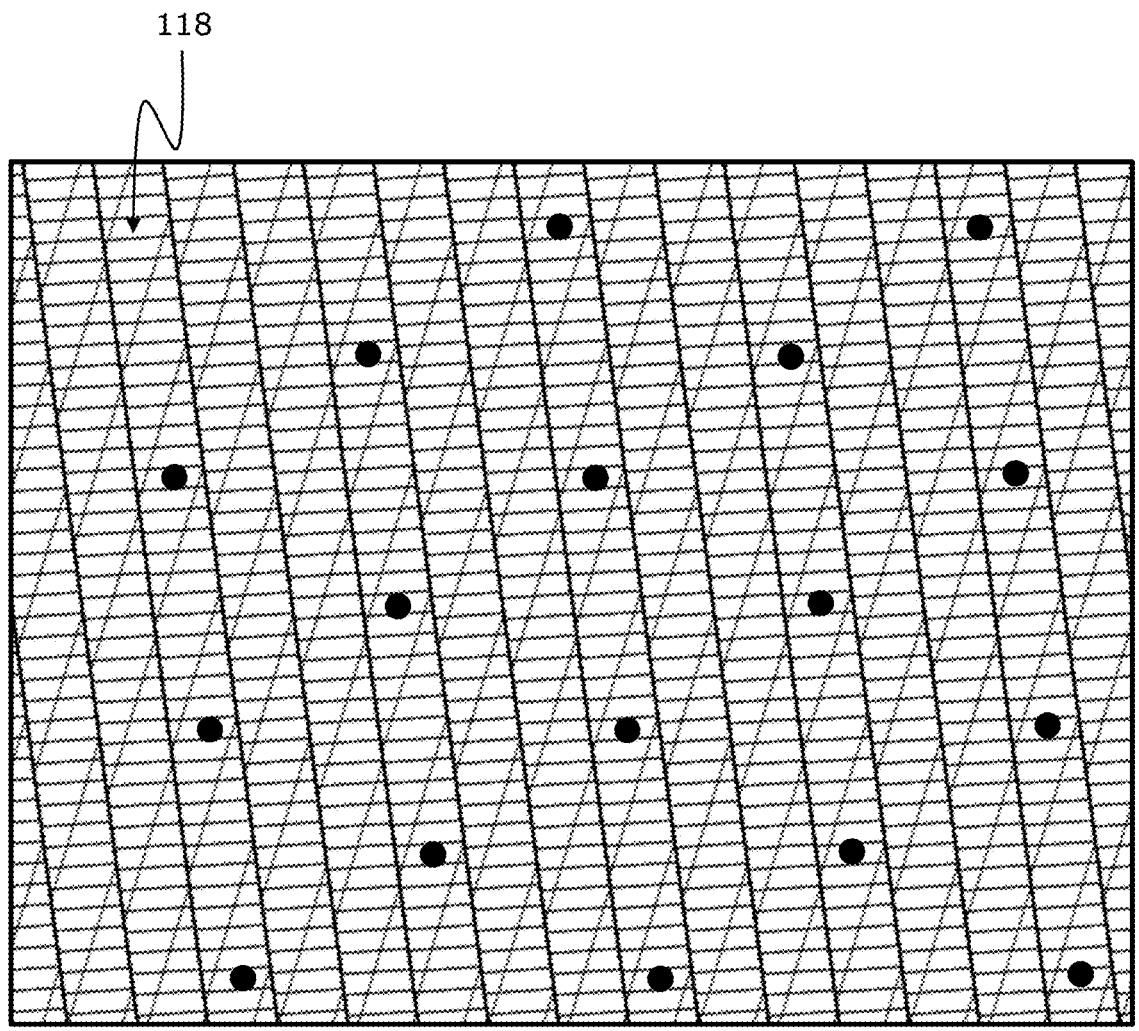
FIG. 1D depicts a set of light-emitting elements onto which a graphical element is rasterized, and light-emitting elements of other sets whose cadence matches with a reference cadence of a reference light-emitting element in the set within a predefined similarity threshold, in accordance with an embodiment of the present disclosure.

FIG. 1D is a schematic illustration of the same portion of the array 108, where dots have been used to indicate corresponding light-emitting elements of other sets whose cadence matches with a reference cadence of the reference light-emitting element in the set within a predefined similarity threshold. As noted earlier, the cadence is determined at a pixel level and not at a subpixel level.

It may be understood by a person skilled in the art that FIGS. 1A and 1B include a simplified example implementation of the system 100, for sake of clarity, which should not unduly limit the scope of the claims herein. It is to be understood that a specific implementation of the system 100 is not to be construed as limiting it to specific numbers or types of trackers, multiscopic displays and processors. A person skilled in the art will recognize many variations, alternatives, and modifications of embodiments of the present disclosure. For example, the multiscopic display may be reflectively viewed via an optical combiner in some implementations.

Figure 2:
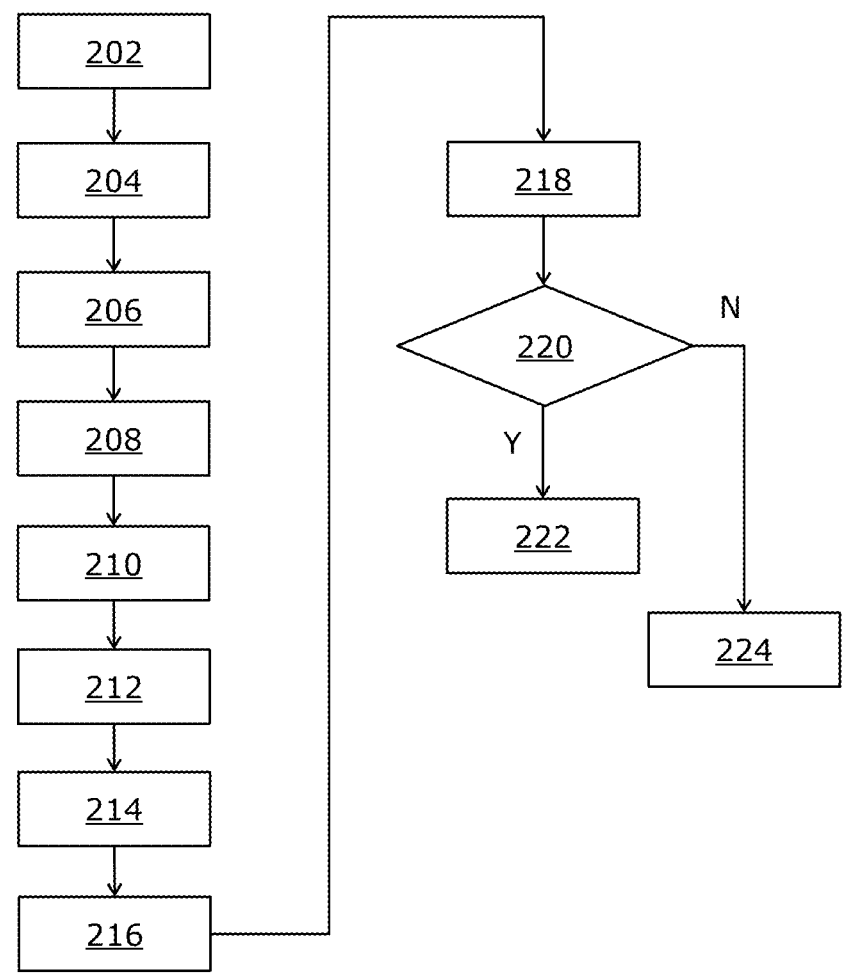
FIG. 2 illustrates steps of a method for performing rasterization and reusing rasterization results in a multiscopic display, in accordance with an embodiment of the present disclosure.

Referring to FIG. 2, illustrated are steps of a method for performing rasterization and reusing rasterization results in a multiscopic display, in accordance with an embodiment of the present disclosure. At step 202, a relative location of each eye of at least one user with respect to an image plane of a multiscopic display is determined, using a tracker. The multiscopic display comprises an array of light-emitting elements, and a multiscopic optical element arranged on an optical path of the array of light-emitting elements. At step 204, a 3D view frustum corresponding to a given eye of the at least one user is determined, based on a relative location of the given eye with respect to the image plane. At step 206, a set of light-emitting elements in the array to be employed to display a graphical element to the given eye is identified, based on a position of the graphical element in the 3D view frustum. At step 208, for each light-emitting element in the set, a perceived shape and a perceived angular size of said light-emitting element from a perspective of the given eye is determined, based on the relative location of the given eye with respect to the image plane, and on optical distortion parameters of the multiscopic optical element. At step 210, the graphical element is rasterized onto the set of light-emitting elements based at least on relative perceived positions of the light-emitting elements in the set from the perspective of the given eye, and the perceived shape and the perceived angular size of each light-emitting element in the set. At step 212, a colour value is computed for each light-emitting element in the set based on the rasterization of the graphical element. At step 214, for the graphical element, computed colour values for the light-emitting elements in the set are stored, along with cadence information indicating a reference cadence of a reference light-emitting element in the set with respect to a multiscopic cell. At step 216, the 3D view frustum corresponding to the given eye is updated, based on a current or predicted relative location of the given eye with respect to the image plane. At step 218, another set of light-emitting elements in the array to be employed to display the graphical element to the given eye is identified, based on the position of the graphical element in the updated 3D view frustum. At step 220, it is determined whether a cadence of a corresponding light-emitting element in the another set with respect to another multiscopic cell matches the reference cadence of the reference light-emitting element in the set within a predefined similarity threshold.

If, at step 220, it is determined that the cadence matches the reference cadence within the predefined similarity threshold, step 222 is performed. At step 222, the stored colour values are reused for the light-emitting elements of the another set to display the graphical element to the given eye.

Otherwise, if, at step 220, it is determined that the cadence does not match the reference cadence within the predefined similarity threshold, step 224 is performed. At step 224, the graphical element may be re-rasterized onto the another set of light-emitting elements, or a further set of light-emitting elements may be searched for reusing the computed colour values.

The aforementioned steps are only illustrative and other alternatives can also be provided where one or more steps are added, or one or more steps are provided in a different sequence without departing from the scope of the claims herein.

The invention claimed is:

1. A system comprising:
a tracker;
a multiscopic display comprising:
   an array of light-emitting elements; and
   a multiscopic optical element arranged on an optical path of the array of light-emitting elements, the multiscopic optical element comprising a plurality of multiscopic cells; and
at least one processor configured to:
   determine a relative location of each eye of at least one user with respect to an image plane of the multiscopic display, using the tracker;
   determine a three-dimensional view frustum corresponding to a given eye of the at least one user, based on a relative location of the given eye with respect to the image plane;
   identify a set of light-emitting elements in the array to be employed to display a graphical element to the given eye, based on a position of the graphical element in the 3D view frustum;
   determine, for each light-emitting element in the set, a perceived shape and a perceived angular size of said light-emitting element from a perspective of the given eye, based on the relative location of the given eye with respect to the image plane, and on optical distortion parameters of the multiscopic optical element;
   rasterize the graphical element onto the set of light-emitting elements based at least on relative perceived positions of the light-emitting elements in the set from the perspective of the given eye, and the perceived shape and the perceived angular size of each light-emitting element in the set;
   compute a colour value for each light-emitting element in the set based on the rasterization of the graphical element;
   store, for the graphical element, computed colour values for the light-emitting elements in the set, along with cadence information indicating a reference cadence of a reference light-emitting element in the set with respect to a multiscopic cell;
   update the 3D view frustum corresponding to the given eye, based on a current or predicted relative location of the given eye with respect to the image plane;
   identify another set of light-emitting elements in the array to be employed to display the graphical element to the given eye, based on the position of the graphical element in the updated 3D view frustum;
   determine whether a cadence of a corresponding light-emitting element in the another set with respect to another multiscopic cell matches the reference cadence of the reference light-emitting element in the set within a predefined similarity threshold; and
   when it is determined that the cadence of the corresponding light-emitting element in the another set matches the reference cadence within the predefined similarity threshold, reuse the stored colour values for the light-emitting elements of the another set to display the graphical element to the given eye.

2. The system of claim 1, wherein the at least one processor is configured to:
   when it is determined that the cadence of the corresponding light-emitting element in the another set does not match the reference cadence within the predefined similarity threshold,
      search for a further set of light-emitting elements in the array to be employed to display the graphical element to the given eye, in place of the another set of light-emitting elements, wherein:
         (i) a cadence of a corresponding light-emitting element in the further set with respect to a corresponding multiscopic cell matches the reference cadence within the predefined similarity threshold, and
         (ii) the further set of light-emitting elements lies within a predefined spatial distance threshold from the another set of light-emitting elements; and
      reuse the stored colour values for the light-emitting elements of the further set to display the graphical element to the given eye.

3. The system of claim 1, wherein the at least one processor is configured to:
   determine a viewing direction from the given eye toward the set of light-emitting elements, based on the relative location of the given eye with respect to the image plane and a position of the set of light-emitting elements in the array;
   store, for the graphical element, the viewing direction in addition to the computed colour values for the light-emitting elements in the set and the cadence information;
   determine a current or predicted viewing direction from the given eye toward the another set of light-emitting elements, based on the current or predicted relative location of the given eye with respect to the image plane and a position of the another set of light-emitting elements in the array;
   determine whether an angular deviation between the current or predicted viewing direction and the stored viewing direction exceeds a predefined angular threshold; and
   when it is determined that the angular deviation exceeds the predefined angular threshold,
      re-rasterize the graphical element onto the another set of light-emitting elements based at least on relative perceived positions of the light-emitting elements in the another set from the perspective of the given eye, and a perceived shape and a perceived angular size of each light-emitting element in the another set; and
      compute a colour value for each light-emitting element in the another set based on the re-rasterization of the graphical element.

4. The system of claim 1, the at least one processor is configured to:
   determine a distance between the given eye and the position of the graphical element in the 3D view frustum;
   determine a scaling factor for the graphical element based on the distance between the given eye and the position of the graphical element in the 3D view frustum;
   store, for the graphical element, the scaling factor in addition to the computed colour values for the light-emitting elements in the set and the cadence information;

determine a current or predicted distance between the given eye and the position of the graphical element in the updated 3D view frustum;

determine a current or predicted scaling factor for the graphical element based on the current or predicted distance between the given eye and the position of the graphical element in the updated 3D view frustum;

determine whether a difference between the current or predicted scaling factor and the stored scaling factor exceeds a predefined scaling threshold; and when it is determined that the difference exceeds the predefined scaling threshold, re-rasterize the graphical element onto the another set of light-emitting elements based at least on relative perceived positions of the light-emitting elements in the another set from the perspective of the given eye, and a perceived shape and a perceived angular size of each light-emitting element in the another set, wherein the another set of light-emitting elements in the array to be employed to display the graphical element to the given eye is identified based further on the current or predicted scaling factor; and compute a colour value for each light-emitting element in the another set based on the re-rasterization of the graphical element.

5. The system of claim 1, wherein a plurality of graphical elements correspond to respective glyphs in a text string, and wherein the at least one processor is configured to:

identify, for each graphical element from among the plurality of graphical elements, a corresponding set of light-emitting elements in the array to be employed to display said graphical element to the given eye, based on a position of said graphical element in the 3D view frustum;

determine, for each light-emitting element in the corresponding set, a perceived shape and a perceived angular size of said light-emitting element from the perspective of the given eye;

rasterize said graphical element onto the corresponding set of light-emitting elements;

compute a colour value for each light-emitting element in the corresponding set based on the rasterization of said graphical element;

store, for said graphical element, computed colour values for the light-emitting elements in the corresponding set, along with cadence information indicating a corresponding reference cadence of a reference light-emitting element in the corresponding set with respect to a corresponding multiscopic cell;

identify another corresponding set of light-emitting elements in the array to be employed to display said graphical element to the given eye, based on the position of said graphical element in the updated 3D view frustum;

determine whether a cadence of a corresponding light-emitting element in the another corresponding set with respect to another corresponding multiscopic cell matches the corresponding reference cadence within the predefined similarity threshold; and when it is determined that the cadence of the corresponding light-emitting element in the another corresponding set matches the corresponding reference cadence within the predefined similarity threshold, reuse the stored colour values for the light-emitting elements of the another corresponding set to display said graphical element to the given eye.

6. The system of claim 5, wherein the at least one processor is configured to:

when it is determined that the cadence of the corresponding light-emitting element in the another corresponding set does not match the corresponding reference cadence within the predefined similarity threshold, search for a further corresponding set of light-emitting elements in the array to be employed to display said graphical element to the given eye, in place of the another corresponding set of light-emitting elements, wherein:

(i) a cadence of a corresponding light-emitting element in the further corresponding set with respect to a corresponding multiscopic cell matches the corresponding reference cadence within the predefined similarity threshold, and (ii) the further corresponding set of light-emitting elements lies within a predefined spatial distance threshold from the another corresponding set of light-emitting elements; and reuse the stored colour values for the light-emitting elements of the further corresponding set to display said graphical element to the given eye.

7. The system of claim 1, wherein the at least one processor is configured to:

determine a second 3D view frustum corresponding to another eye of the at least one user, based on a current or predicted relative location of the another eye with respect to the image plane;

identify a second set of light-emitting elements in the array to be employed to display the graphical element to the another eye, based on a position of the graphical element in the second 3D view frustum;

determine whether a cadence of a corresponding light-emitting element in the second set with respect to a corresponding multiscopic cell matches the reference cadence of the reference light-emitting element in the set within a predefined similarity threshold; and when it is determined that the cadence of the corresponding light-emitting element in the second set matches the reference cadence within the predefined similarity threshold, reuse the stored colour values for the light-emitting elements of the second set to display the graphical element to the another eye.

8. The system of claim 1, wherein the at least one processor is configured to:

predict a future relative location of the given eye with respect to the image plane;

determine a future 3D view frustum corresponding to the given eye, based on the future relative location;

identify a future set of light-emitting elements in the array to be employed to display the graphical element to the given eye at a future time instant, based on a position of the graphical element in the future 3D view frustum;

determine, for each light-emitting element in the future set, a perceived shape and a perceived angular size of said light-emitting element from a perspective of the given eye, based on the future relative location and optical distortion parameters of the multiscopic optical element;

rasterize the graphical element onto the future set of light-emitting elements based at least on relative perceived positions of the light-emitting elements in the future set from the perspective of the given eye, and the perceived shape and the perceived angular size of each light-emitting element in the future set;

compute a colour value for each light-emitting element in the future set based on the rasterization of the graphical element;

store, for the graphical element, computed colour values for the light-emitting elements in the future set, along with cadence information indicating a future reference cadence of a reference light-emitting element in the future set with respect to a multiscopic cell;

update the future 3D view frustum corresponding to the given eye, based on a current relative location of the given eye with respect to the image plane;

identify a current set of light-emitting elements in the array to be employed to display the graphical element to the given eye at a current time instant, based on the position of the graphical element in the updated future 3D view frustum;

determine whether a cadence of a corresponding light-emitting element in the current set with respect to a corresponding multiscopic cell matches the future reference cadence of the reference light-emitting element in the future set within another predefined similarity threshold; and when it is determined that the cadence of the corresponding light-emitting element in the current set matches the future reference cadence within the another predefined similarity threshold, reuse the stored colour values for the light-emitting elements of the current set to display the graphical element to the given eye at the current time instant.

9. The system of claim 1, wherein the another set of light-emitting elements in the array is vertically offset from the set of light-emitting elements in the array by a distance within a predefined vertical offset threshold.

10. The system of claim 1, wherein the at least one processor is configured to:
determine a gaze direction of each eye of the at least one user, using the tracker;
determine whether the at least one user is looking at the graphical element, based on the gaze direction of either eye or each eye of the at least one user; and
when it is determined that the at least one user is looking at the graphical element, reduce the predefined similarity threshold used for determining whether the cadence of the corresponding light-emitting element in the another set matches the reference cadence.

11. The system of claim 1, wherein the at least one processor is configured to:
determine a gaze direction of each eye of the at least one user, using the tracker;
determine whether the at least one user is looking at the graphical element, based on the gaze direction of either eye or each eye of the at least one user; and
when it is determined that the at least one user is looking at the graphical element,
bypass reuse of the stored colour values;
re-rasterize the graphical element onto the another set of light-emitting elements; and
compute a colour value for each light-emitting element in the another set based on the re-rasterization of the graphical element.

12. A method comprising:
determining a relative location of each eye of at least one user with respect to an image plane of a multiscopic display, using a tracker, wherein the multiscopic display comprises an array of light-emitting elements and a multiscopic optical element arranged on an optical path of the array of light-emitting elements, the multiscopic optical element comprising a plurality of multiscopic cells;

determining a three-dimensional view frustum corresponding to a given eye of the at least one user, based on a relative location of the given eye with respect to the image plane;

identifying a set of light-emitting elements in the array to be employed to display a graphical element to the given eye, based on a position of the graphical element in the 3D view frustum;

determining, for each light-emitting element in the set, a perceived shape and a perceived angular size of said light-emitting element from a perspective of the given eye, based on the relative location of the given eye with respect to the image plane, and on optical distortion parameters of the multiscopic optical element;

rasterizing the graphical element onto the set of light-emitting elements based at least on relative perceived positions of the light-emitting elements in the set from the perspective of the given eye, and the perceived shape and the perceived angular size of each light-emitting element in the set;

computing a colour value for each light-emitting element in the set based on the rasterization of the graphical element;

storing, for the graphical element, computed colour values for the light-emitting elements in the set, along with cadence information indicating a reference cadence of a reference light-emitting element in the set with respect to a multiscopic cell;

updating the 3D view frustum corresponding to the given eye, based on a current or predicted relative location of the given eye with respect to the image plane;

identifying another set of light-emitting elements in the array to be employed to display the graphical element to the given eye, based on the position of the graphical element in the updated 3D view frustum;

determining whether a cadence of a corresponding light-emitting element in the another set with respect to another multiscopic cell matches the reference cadence of the reference light-emitting element in the set within a predefined similarity threshold; and when it is determined that the cadence of the corresponding light-emitting element in the another set matches the reference cadence within the predefined similarity threshold, reusing the stored colour values for the light-emitting elements of the another set to display the graphical element to the given eye.

13. The method of claim 12, further comprising:
when it is determined that the cadence of the corresponding light-emitting element in the another set does not match the reference cadence within the predefined similarity threshold,
searching for a further set of light-emitting elements in the array to be employed to display the graphical element to the given eye, in place of the another set of light-emitting elements, wherein:
(i) a cadence of a corresponding light-emitting element in the further set with respect to a corresponding multiscopic cell matches the reference cadence within the predefined similarity threshold, and
(ii) the further set of light-emitting elements lies within a predefined spatial distance threshold from the another set of light-emitting elements; and reusing the stored colour values for the light-emitting elements of the further set to display the graphical element to the given eye.

14. The method of claim 12, further comprising:
determining a viewing direction from the given eye toward the set of light-emitting elements, based on the relative location of the given eye with respect to the image plane and a position of the set of light-emitting elements in the array;
storing, for the graphical element, the viewing direction in addition to the computed colour values for the light-emitting elements in the set and the cadence information;
determining a current or predicted viewing direction from the given eye toward the another set of light-emitting elements, based on the current or predicted relative location of the given eye with respect to the image plane and a position of the another set of light-emitting elements in the array;
determining whether an angular deviation between the current or predicted viewing direction and the stored viewing direction exceeds a predefined angular threshold; and
when it is determined that the angular deviation exceeds the predefined angular threshold,
re-rasterizing the graphical element onto the another set of light-emitting elements based at least on relative perceived positions of the light-emitting elements in the another set from the perspective of the given eye, and a perceived shape and a perceived angular size of each light-emitting element in the another set; and
computing a colour value for each light-emitting element in the another set based on the re-rasterization of the graphical element.

15. The method of claim 12, further comprising:
determining a distance between the given eye and the position of the graphical element in the 3D view frustum;
determining a scaling factor for the graphical element based on the distance between the given eye and the position of the graphical element in the 3D view frustum;
storing, for the graphical element, the scaling factor in addition to the computed colour values for the light-emitting elements in the set and the cadence information;
determining a current or predicted distance between the given eye and the position of the graphical element in the updated 3D view frustum;
determining a current or predicted scaling factor for the graphical element based on the current or predicted distance between the given eye and the position of the graphical element in the updated 3D view frustum;
determining whether a difference between the current or predicted scaling factor and the stored scaling factor exceeds a predefined scaling threshold; and
when it is determined that the difference exceeds the predefined scaling threshold,
re-rasterizing the graphical element onto the another set of light-emitting elements based at least on relative perceived positions of the light-emitting elements in the another set from the perspective of the given eye, and a perceived shape and a perceived angular size of each light-emitting element in the another set, wherein the another set of light-emitting elements in the array to be employed to display the graphical element to the given eye is identified based further on the current or predicted scaling factor; and
computing a colour value for each light-emitting element in the another set based on the re-rasterization of the graphical element.

16. The method of claim 12, wherein a plurality of graphical elements correspond to respective glyphs in a text string, and wherein the method further comprises:
identifying, for each graphical element from among the plurality of graphical elements, a corresponding set of light-emitting elements in the array to be employed to display said graphical element to the given eye, based on a position of said graphical element in the 3D view frustum;
determining, for each light-emitting element in the corresponding set, a perceived shape and a perceived angular size of said light-emitting element from the perspective of the given eye;
rasterizing said graphical element onto the corresponding set of light-emitting elements;
computing a colour value for each light-emitting element in the corresponding set based on the rasterization of said graphical element;
storing, for said graphical element, computed colour values for the light-emitting elements in the corresponding set, along with cadence information indicating a corresponding reference cadence of a reference light-emitting element in the corresponding set with respect to a corresponding multiscopic cell;
identifying another corresponding set of light-emitting elements in the array to be employed to display said graphical element to the given eye, based on the position of said graphical element in the updated 3D view frustum;
determining whether a cadence of a corresponding light-emitting element in the another corresponding set with respect to another corresponding multiscopic cell matches the corresponding reference cadence within the predefined similarity threshold; and
when it is determined that the cadence of the corresponding light-emitting element in the another corresponding set matches the corresponding reference cadence within the predefined similarity threshold, reusing the stored colour values for the light-emitting elements of the another corresponding set to display said graphical element to the given eye.

17. The method of claim 16, further comprising:
when it is determined that the cadence of the corresponding light-emitting element in the another corresponding set does not match the corresponding reference cadence within the predefined similarity threshold,
searching for a further corresponding set of light-emitting elements in the array to be employed to display said graphical element to the given eye, in place of the another corresponding set of light-emitting elements, wherein:
(i) a cadence of a corresponding light-emitting element in the further corresponding set with respect to a corresponding multiscopic cell matches the corresponding reference cadence within the predefined similarity threshold, and
(ii) the further corresponding set of light-emitting elements lies within a predefined spatial distance threshold from the another corresponding set of light-emitting elements; and reusing the stored colour values for the light-emitting elements of the further corresponding set to display said graphical element to the given eye.

18. The method of claim 12, further comprising:

determining a second 3D view frustum corresponding to another eye of the at least one user, based on a current or predicted relative location of the another eye with respect to the image plane;

identifying a second set of light-emitting elements in the array to be employed to display the graphical element to the another eye, based on a position of the graphical element in the second 3D view frustum;

determining whether a cadence of a corresponding light-emitting element in the second set with respect to a corresponding multiscopic cell matches the reference cadence of the reference light-emitting element in the set within a predefined similarity threshold; and when it is determined that the cadence of the corresponding light-emitting element in the second set matches the reference cadence within the predefined similarity threshold, reusing the stored colour values for the light-emitting elements of the second set to display the graphical element to the another eye.

19. The method of claim 12, further comprising:

predicting a future relative location of the given eye with respect to the image plane;

determining a future 3D view frustum corresponding to the given eye, based on the future relative location;

identifying a future set of light-emitting elements in the array to be employed to display the graphical element to the given eye at a future time instant, based on a position of the graphical element in the future 3D view frustum;

determining, for each light-emitting element in the future set, a perceived shape and a perceived angular size of said light-emitting element from a perspective of the given eye, based on the future relative location and optical distortion parameters of the multiscopic optical element;

rasterizing the graphical element onto the future set of light-emitting elements based at least on relative perceived positions of the light-emitting elements in the future set from the perspective of the given eye, and the perceived shape and the perceived angular size of each light-emitting element in the future set;

computing a colour value for each light-emitting element in the future set based on the rasterization of the graphical element;

storing, for the graphical element, computed colour values for the light-emitting elements in the future set, along with cadence information indicating a future reference cadence of a reference light-emitting element in the future set with respect to a multiscopic cell;

updating the future 3D view frustum corresponding to the given eye, based on a current relative location of the given eye with respect to the image plane;

identifying a current set of light-emitting elements in the array to be employed to display the graphical element to the given eye at a current time instant, based on the position of the graphical element in the updated future 3D view frustum;

determining whether a cadence of a corresponding light-emitting element in the current set with respect to a corresponding multiscopic cell matches the future reference cadence of the reference light-emitting element in the future set within another predefined similarity threshold; and when it is determined that the cadence of the corresponding light-emitting element in the current set matches the future reference cadence within the another predefined similarity threshold, reusing the stored colour values for the light-emitting elements of the current set to display the graphical element to the given eye at the current time instant.

20. The method of claim 12, wherein the another set of light-emitting elements in the array is vertically offset from the set of light-emitting elements in the array by a distance within a predefined vertical offset threshold.

* * * * *